US010073258B2

(12) United States Patent
Yamada

(10) Patent No.: US 10,073,258 B2
(45) Date of Patent: Sep. 11, 2018

(54) MICROSCOPE SYSTEM

(71) Applicant: OLYMPUS CORPORATION, Tokyo (JP)

(72) Inventor: Tatsuki Yamada, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 247 days.

(21) Appl. No.: 14/931,166

(22) Filed: Nov. 3, 2015

(65) Prior Publication Data

US 2016/0147058 A1 May 26, 2016

(30) Foreign Application Priority Data

Nov. 25, 2014 (JP) .................................. 2014-238032

(51) Int. Cl.
G06F 19/00 (2018.01)
G06T 3/40 (2006.01)
(Continued)

(52) U.S. Cl.
CPC ......... *G02B 21/367* (2013.01); *G02B 21/244* (2013.01); *G02B 21/26* (2013.01);
(Continued)

(58) Field of Classification Search
CPC .... G02B 21/367; G02B 21/365; G02B 21/36; G02B 21/008; G02B 21/025;
(Continued)

(56) References Cited

U.S. PATENT DOCUMENTS

2005/0163398 A1 7/2005 Ioka
2007/0053569 A1* 3/2007 Douglass ............... G01N 1/312
382/128
(Continued)

FOREIGN PATENT DOCUMENTS

EP 1 640 908 A1 3/2006
JP H09-281405 A 10/1997
(Continued)

OTHER PUBLICATIONS

Japanese Notification of Reasons for Refusal dated Apr. 17, 2018 received in Japanese Patent Application No. 2014-238032, together with an English-language translation.

Primary Examiner — Dave Czekaj
Assistant Examiner — Alison Slater
(74) Attorney, Agent, or Firm — Scully, Scott, Murphy & Presser, P.C.

(57) ABSTRACT

A microscope system including an objective lens, a camera for capturing an image of light that comes from a specimen and that is collected by the objective lens, a stage for moving the specimen and the objective lens relative to each other in a direction perpendicular to an optical axis, a controller implementing a VS-image generation for generating a VS image by joining a plurality of microscope-image groups that are acquired while moving the objective lens and the specimen relative to each other, a correction-region search for searching for a correction region for acquiring a correction image, a correction-data generation for generating shading-correction data based on the correction image acquired for the searched-for correction region, and a shading correction for performing correction by using the generated shading-correction data.

11 Claims, 13 Drawing Sheets

(51) Int. Cl.
*G01N 15/14* (2006.01)
*G02B 21/00* (2006.01)
*G02B 21/36* (2006.01)
*G02B 21/26* (2006.01)
*H04N 5/357* (2011.01)
*G02B 21/24* (2006.01)
*H04N 5/225* (2006.01)
*G02B 21/16* (2006.01)

(52) U.S. Cl.
CPC ......... *H04N 5/2256* (2013.01); *H04N 5/3572* (2013.01); *G02B 21/16* (2013.01)

(58) Field of Classification Search
CPC .. G02B 21/244; G02B 21/00; G02B 21/0004; G06T 5/50; G06T 2207/10056; G06T 2207/20212; G06T 11/00; G06T 5/002; G06T 5/008; G06K 9/00127; G06K 9/00134; G01N 15/1468; G01N 1/312
See application file for complete search history.

(56) References Cited

U.S. PATENT DOCUMENTS

| | | | |
|---|---|---|---|
| 2007/0066967 A1* | 3/2007 | Sieckmann | G01N 1/2813 606/10 |
| 2009/0212242 A1 | 8/2009 | Yamada | |
| 2010/0141752 A1 | 6/2010 | Yamada | |
| 2010/0272334 A1 | 10/2010 | Yamada | |
| 2013/0329033 A1* | 12/2013 | Shibata | H04N 5/2355 348/79 |
| 2014/0267679 A1 | 9/2014 | Hauck | |

FOREIGN PATENT DOCUMENTS

| | | |
|---|---|---|
| JP | 2004-343222 A | 12/2004 |
| JP | 2006-171213 A | 6/2006 |
| JP | 2008-051773 A | 3/2008 |
| JP | 2009-14939 A | 1/2009 |
| JP | 2010-134195 A | 6/2010 |
| JP | 2013-246187 A | 12/2013 |
| JP | 2013-257422 A | 12/2013 |

* cited by examiner

| SUBSECTION COORDINATE NUMBER | STAGE COORDINATES | | |
|---|---|---|---|
| | x AXIS | y AXIS | z AXIS |
| (001, 001) | | | |
| (002, 001) | | | |
| (003, 001) | | | |
| ⋮ | | | |
| (001, 002) | | | |
| (002, 002) | | | |
| ⋮ | | | |

QUALIFIED SECTION

MICROSCOPE SYSTEM

CROSS-REFERENCE TO RELATED APPLICATIONS

This application is based on Japanese Patent Application No. 2014-238032, the contents of which are incorporated herein by reference.

TECHNICAL FIELD

The present invention relates to a microscope system.

BACKGROUND ART

There are known microscope systems with which a plurality of images are captured while moving the viewing field by using an electrically-powered stage or the like and, by pasting (or joining) these images together, large-field, high-resolution microscope images (namely, virtual-slide images, which will hereinafter also be referred to as VS images) are created, and with which the created images are utilized for pathological diagnosis or the like (for example, see Patent Literatures 1 to 3).

When acquiring specimen images by using microscopes, brightness unevenness (shading) occurs in the acquired images due to uneven illumination, nonuniformity of optical systems, unevenness in the sensitivity of image-acquisition devices, and the states of the specimen (surface shape, surface characteristics, thickness, or the like). In virtual microscope systems, with VS images created by pasting together a plurality of images, for example, unnatural changes, such as vertical stripes, horizontal stripes, or the like, appear in the images, which are conspicuous mainly at image-joining portions.

As methods of solving the problem of shading, there are known methods in which shading-correction data are obtained from microscope images of a calibration sample, and in which shading in acquired images of a specimen, which is an observation subject and a measurement subject, is corrected by using the shading-correction data (for example, see Patent Literatures 4 to 6).

In Patent Literature 4, shading correction is performed during transmission-illumination observation by acquiring calibration image data by using a background acquired without a specimen and, during epi-illumination observation, by acquiring calibration image data by using a reflection-only part provided in the microscope system. In Patent Literature 5, shading correction is performed by acquiring calibration image data by using a uniform fluorescent specimen as a calibration specimen. In addition, Patent Literature 6 discloses a method in which shading-correction data are obtained based on changes in brightness of images of a predetermined position between when that position is acquired at the center of the viewing field and when that position is acquired at an edge of the viewing field by using a specimen itself, which is an observation subject and a measurement subject, instead of using a calibration sample.

CITATION LIST

Patent Literature

{PTL 1} Japanese Unexamined Patent Application, Publication No. Hei 9-281405
{PTL 2} Japanese Unexamined Patent Application, Publication No. 2009-14939
{PTL 3} Japanese Unexamined Patent Application, Publication No. 2013-246187
{PTL 4} Japanese Unexamined Patent Application, Publication No. 2006-171213
{PTL 5} Japanese Unexamined Patent Application, Publication No. 2008-51773
{PTL 6} Japanese Unexamined Patent Application, Publication No. 2013-257422

SUMMARY OF INVENTION

An aspect of the present invention is a microscope system including, an objective lens that collects light coming from a specimen; an image acquiring means for capturing an image of the light collected by the objective lens; a moving means for moving the specimen and the objective lens relative to each other in a direction perpendicular to an optical axis; a VS-image generating means for generating a virtual-slide image by joining together a plurality of microscope-image groups that are acquired by the image acquiring means while moving the objective lens and the specimen relative to each other by means of the moving means; a correction-region searching means for searching for a correction region for acquiring a correction image for generating shading-correction data; a correction-data generating means for causing the image acquiring means to acquire the correction image for the correction region searched for by the correction-region searching means and for generating the shading-correction data based on the acquired correction image; and a shading correcting means for correcting shading in the microscope image by using the shading-correction data generated by the correction-data generating means.

DESCRIPTION OF EMBODIMENT

A microscope system 1 according to an embodiment of the present invention will be described below with reference to the drawings.

Figure 1:
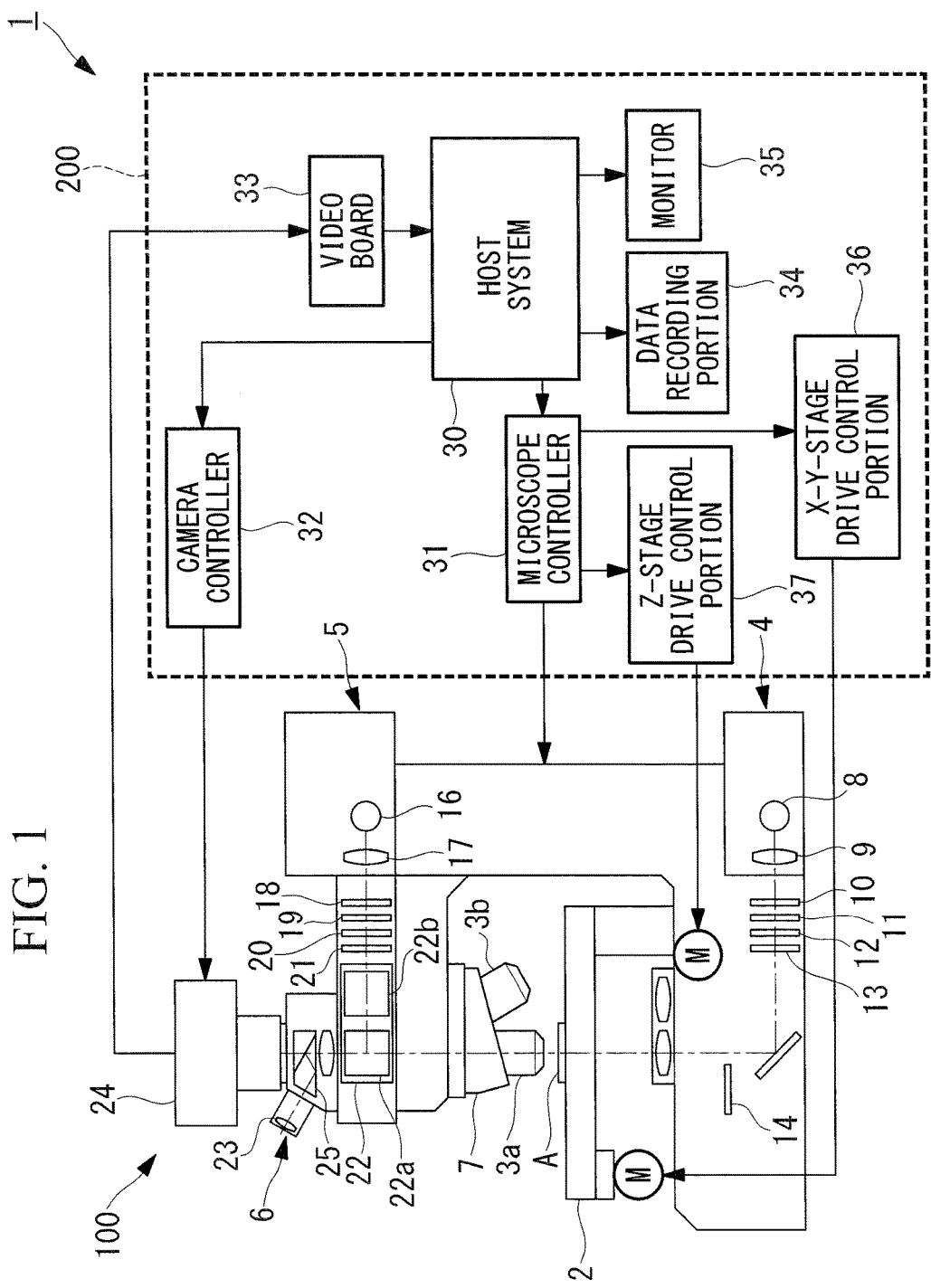
FIG. 1 is an overall configuration diagram showing a microscope system according to an embodiment of the present invention.

As shown in FIG. 1, the microscope system 1 according to this embodiment is provided with a microscope apparatus 100 and a processing apparatus 200.

The microscope apparatus 100 is provided with an electrically-powered stage (moving means) 2 on which a specimen A is mounted, objective lenses 3a and 3b that are disposed above the specimen A so as to face it and that collect light coming from the specimen A, a transmission-illumination optical system 4 that makes illumination light incident from below the specimen A, an epi-illumination optical system 5 that makes illumination light incident from above the specimen A via the objective lenses 3a and 3b, and a detection optical system 6 that detects the light collected by the objective lenses 3a and 3b.

Figure 2A:
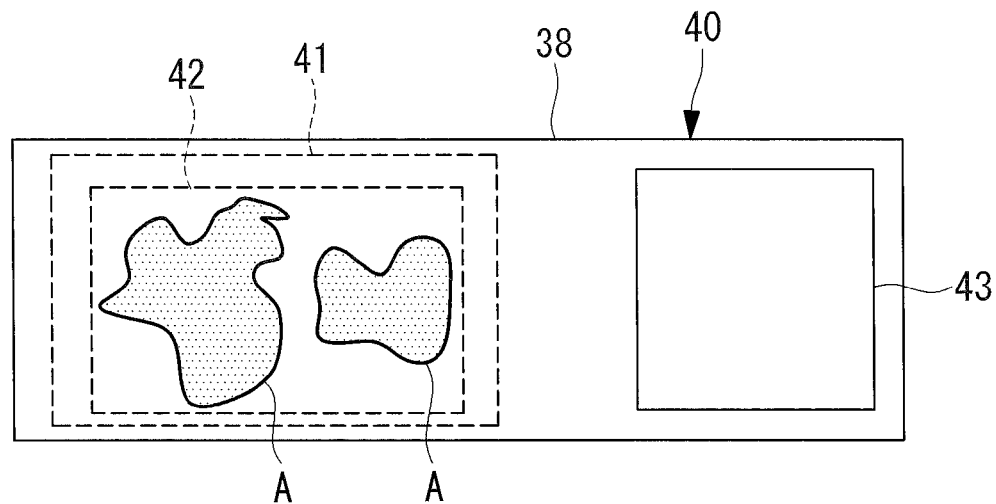
FIG. 2A is a diagram showing an example slide glass specimen to be observed by using the microscope system in FIG. 1.
Figure 2B:
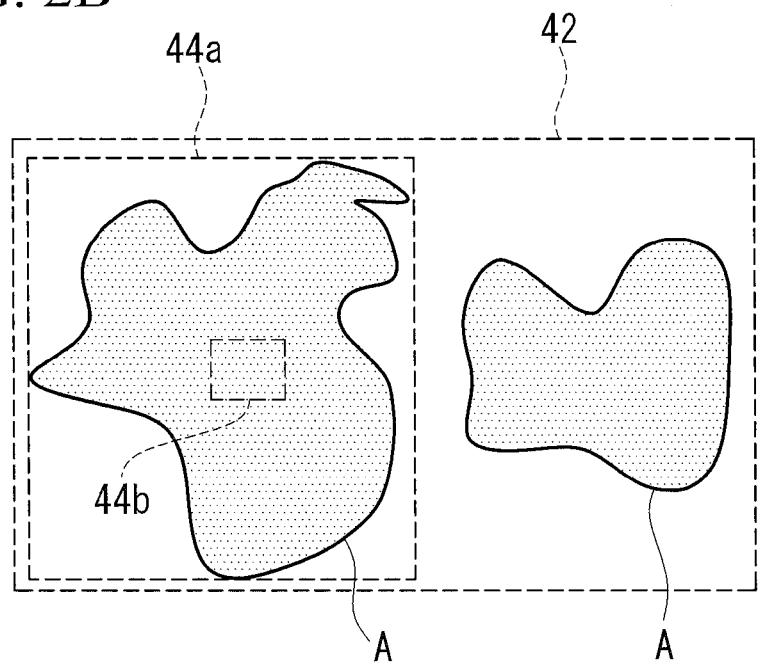
FIG. 2B is a diagram showing an example specimen region to be observed by using the microscope system in FIG. 1.

As shown in FIGS. 2A and 2B, for example, the specimen A is a slide glass specimen 40 (a specimen in which the specimen A is mounted on a slide glass 38). Although FIG. 1 shows only the specimen A, in reality, the slide glass specimen 40 is set on the electrically-powered stage 2.

The electrically-powered stage 2 is configured so as to move the specimen A mounted thereon in a vertical direction (Z-direction) that is parallel to optical axes of the objective lenses 3a and 3b and two horizontal directions (X- and Y-directions) that are perpendicular to the optical axes of the objective lenses 3a and 3b. The electrically-powered stage 2 has a function for detecting the position of the origin, which is achieved by means of an origin sensor (not shown), and is configured so that coordinates can be set for individual portions of the specimen A mounted on the electrically-powered stage 2.

With regard to the objective lenses 3a and 3b, a plurality of lenses having different optical characteristics, such as magnifications or the like, are mounted, and the one that is used for observing the specimen A is selectively placed so as to face the specimen A by operating a revolver (magnification changing means) 7.

The transmission-illumination optical system 4 is provided with a transmission-illumination light source 8, a collector lens 9 that collects illumination light coming from the transmission-illumination light source 8, a transmission-illumination filter unit 10, a transmission-illumination shutter 11, a transmission-illumination field stop 12, a transmission-illumination aperture stop 13, a condenser optical device unit 14, and a top lens unit.

The epi-illumination optical system 5 is provided with an epi-illumination light source 16, a collector lens 17, an epi-illumination filter unit 18, an epi-illumination shutter 19, an epi-illumination field stop 20, and an epi-illumination aperture stop 21.

The detection optical system 6 is provided with an optical filter unit 22 that selects the wavelength of the light coming from the specimen A, an ocular lens 23 for observing, with the eye, the light that has been transmitted through the optical filter unit 22, a camera (image acquiring means) 24 for capturing an image of this transmitted light, and a beam splitter 25 that splits the optical path into one going toward the ocular lens 23 and the other going toward the camera 24.

The optical filter unit 22 is provided with a plurality of optical cubes 22a and 22b having different transmittance characteristics, and is configured so as to selectively place one of the optical cubes 22a and 22b in the optical path in accordance with the observation method.

The individual components described above are electrically powered, and operations thereof are controlled by a microscope controller 31 described below.

The processing apparatus 200 is provided with a host system 30, a microscope controller 31 connected to the host system 30, a camera controller 32, a video board 33, a data recording portion 34, a monitor 35, an x-y-stage drive control portion 36 connected to the microscope controller 31, and a z-stage drive control portion 37.

The microscope controller 31 has a function for controlling the overall operation of the microscope apparatus 100, and functions thereof also include controlling individual components, such as changing observation methods and adjusting the light emitted by the transmission-illumination light source 8 and the epi-illumination light source 16 in accordance with control signals from the host system 30, as well as detecting current states of the individual components of the microscope apparatus 100 and transmitting this information to the host system 30. In addition, the microscope controller 31 also controls the electrically-powered stage 2 via the x-y-stage drive control portion 36 and the z-stage drive control portion 37.

The camera controller 32 sets the ON/OFF state of automatic gain control, gain setting, the ON/OFF state of automatic exposure control, and the exposure time for the camera 24 in accordance with control signals from the host system 30.

The host system 30 receives microscope images of the specimen A acquired by a CCD (not shown), which is the image-acquisition device in the camera 24, via the video board 33.

In addition, the host system 30 saves the microscope images transmitted thereto from the camera 24 in the data recording portion 34 in the form of image data files. The data recording portion 34 is, for example, a hard disk, a large-capacity memory, or the like.

The image data files recorded in the data recording portion 34 are read out by the host system 30 at an arbitrary timing, for example, in response to a user operation or the like, and thus, the microscope images are displayed on the monitor 35.

Furthermore, the host system 30 has a so-called video AF function for focusing based on the contrast of a microscope image acquired by the camera 24.

Note that, although illustrations are not included in particular, the host system 30 is a computer having a CPU (central processing unit) that controls the overall operation of the microscope system 1 by executing control programs, a main memory that the CPU uses as a working memory as needed, input portions such as a mouse, a keyboard, and so forth for acquiring various instructions from a user, an interface unit that manages the exchange of various data among individual components of the microscope system 1, an auxiliary storage apparatus, for example, a hard disk device or the like, for storing various programs and data, and a displaying apparatus such as a display or the like.

Figure 16:
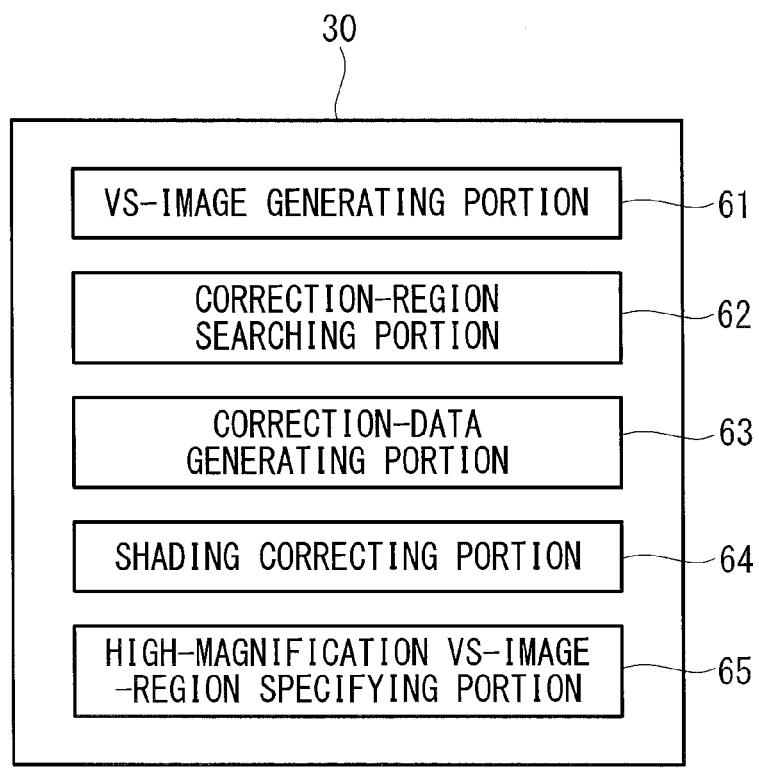
FIG. 16 is a partial configuration diagram showing a host-system portion of the microscope system in FIG. 1.

Thus, various processes described below are realized when the CPU of the host system 30 reads out predetermined application programs stored in the auxiliary storage apparatus to the main memory and executes them. When the processing is performed, there are cases in which the host system 30 transmits the control signals to the microscope controller 31 and causes the microscope controller 31 to control the individual components of the microscope apparatus 100, such as controlling the movement of the electrically-powered stage 2, changing observation methods, or the like, or causes the microscope controller 31 to detect states of the individual components or the like; however, in the following, these situations will not be described in detail. Specifically, as shown in FIG. 16, the host system 30 in this embodiment is provided with a VS-image generating portion 61, a correction-region searching portion 62, a correction-data generating portion 63, a shading correcting portion 64, and a high-magnification VS-image-region specifying portion 65, which are configured to serve as a VS-image generating means, a correction-region searching means, a correction-data generating means, a shading correcting means, and a high-magnification VS-image-region specifying means, respectively.

{VS-Image Constructing Processing}

Next, VS-image constructing processing performed by the microscope system 1 according to this embodiment will be described with reference to FIG. 2A, FIG. 2B, and FIG. 3.

Because details of the VS-image constructing processing are described in Patent Literatures 1 to 3 by this applicant, only an overview will be described here. In this embodiment, the VS-image constructing processing for the specimen A shown in FIGS. 2A and 2B will be described by using the flowchart shown in FIG. 3.

First, a processing flow in a case in which a transmission-illumination bright-field specimen, a typical example of which is an HE stained specimen, is employed will be described, and, subsequently, portions that are different from the case of the transmission-illumination bright-field specimen will be described for a case in which a fluorescent specimen is employed.

When observing a transmission-illumination bright-field specimen, first, an overall image of the specimen A on the slide glass 38 mounted on the electrically-powered stage 2 is acquired (step S100). The specimen A is assumed to be an HE-stained transmission-illumination bright-field specimen.

Then, in order to realize the transmission-illumination bright-field observation method, various optical members are placed in and removed from the optical path. Specifically, in order to prepare a state for performing transmission-illumination bright-field observation, the host system 30 performs control via the microscope controller 31 to place the epi-illumination shutter 19 in the optical path, to place the optical cube 22$a$ for performing the bright-field observation in the optical path, and to turn on the transmission-illumination light source 8.

In other words, the control for switching the observation method to the bright-field observation method is performed. Then, for example, a low-magnification objective lens 3$a$ having a magnification of about 2× is placed in the optical path. Subsequently, a predetermined specimen search area 41 (for example, L 25 mm×W 50 mm) on the slide glass 38 shown in FIG. 2A is divided in accordance with the width of an image-acquisition region projected on the camera 24 (in other words, the specimen search area 41 is divided in accordance with the magnification of the objective lens 3$a$ placed in the optical path).

Then, the electrically-powered stage 2 is moved in the X- and Y-directions and an microscope image is acquired via the camera 24 at the section to which the stage is moved to; this process is repeated for the plurality of sections created by dividing the specimen search area 41. The plurality of microscope images (low-magnification images of the individual sections) obtained in this way are joined together, thus creating a VS image of the entire slide glass 38 (an image of the entire specimen search area 41 shown in FIG. 2B, which, hereinafter, will be referred to as an overall VS image), and the overall VS image is recorded in the data recording portion 34.

Next, a region in which the specimen A is actually placed on the slide glass 38 (a specimen region 42 shown in FIG. 2B) is automatically identified based on the luminance information of the overall VS image acquired in step S100 (step S102). A known method, such as the one described in Patent Literature 3, is used as the method of identifying the specimen A. In the figures, reference sign 43 is a label for distinguishing the slide glass specimen 40.

Next, the observation method is switched to one used in the subsequent processing for constructing a VS image (hereinafter, referred to as a high-definition VS image) by using the high-magnification objective lens 3$b$ (step S104). Here, the high magnification means a higher magnification than the magnification of the low-magnification objective lens 3$a$ used in step S100. The specimen A to be observed is a transmission-illumination bright-field specimen, and, because the state for performing the transmission-illumination bright-field observation has already been prepared in step S100, control therefor is not performed in particular.

Then, an operator selects the objective lens 3$b$ to be used for constructing the high-definition VS image in steps S120 to S160 that follow (step S110).

Subsequently, by manipulating the mouse (not shown), the operator specifies a region in the overall VS image, which is an area for which a high-definition VS image will be formed (step S120).

For example, in the case of a scanning region 44$a$ shown in FIG. 2B, specifications such as "a high-definition VS image will be formed by using a 10× objective lens" and so forth are given. Note that the calculation method with which the X-Y coordinates on an image are converted to actual physical X-Y coordinates on the electrically-powered stage 2 involves a calculation based on the image-capturing magnification and the image-capturing device information (number of pixels and pixel size), and because it is assumed that the method described in detail in Patent Literature 1 is employed, a description thereof will be omitted herein.

Figures 4, 5:
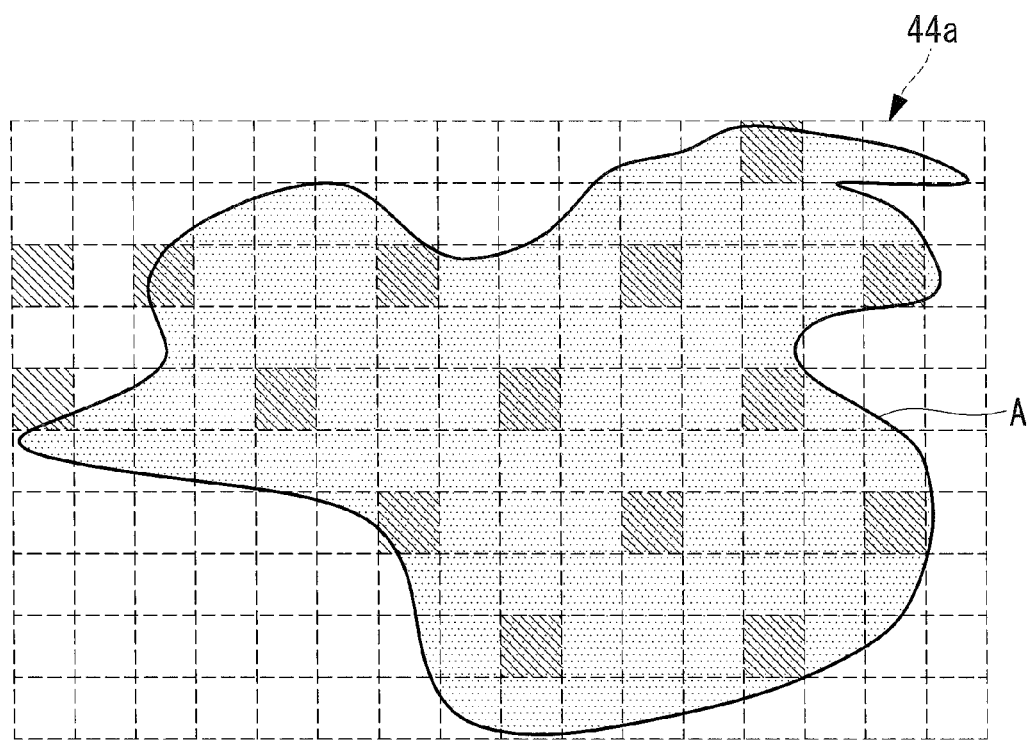
FIG. 4 is a diagram showing a specimen image for explaining focus-map generation performed by the microscope system in FIG. 1.
FIG. 5 is a diagram showing an example data structure of the focus map in FIG. 4.

Next, as shown in FIG. 4, the scanning region 44$a$ selected in step S110 is divided into subsections designated as regions for which images are to be captured via the high-magnification objective lens 3$b$, and the subsections for taking actual measurements of focus positions are automatically selected (step S130).

Then, specimen images are input for the subsections for taking actual measurements of the focus positions selected in step S130 to evaluate the contrasts thereof, and thus, the in-focus positions (Z coordinates) are determined based on the actual measurements.

Furthermore, as for the subsections that were not identified as the focus-position identifying points in step S130, in-focus positions (Z coordinates) thereof are determined by means of interpolation based on the actually-measured in-focus positions (Z coordinates) of the neighboring focus-position identifying points, thus creating a focus map 50 shown in FIG. 5, which is recorded in the data recording portion 34 (step S140). With regard to the details of the focus-map generation, because it is assumed that a known method, like that described in Patent Literature 3, is employed, descriptions thereof will be omitted herein.

Next, by controlling the electrically-powered stage 2 based on the information of the focus map 50 created in step S140, separate images for the individual subsections are acquired (step S150).

Then, the input images of the individual subsections are joined with the images of subsections adjacent thereto. By repeating the image-inputting processing and the image joining processing until the procedures are completed for all of the subsections registered in the focus map 50, the creation of a high-definition VS image is completed, which is a large-field, high-definition microscope image in which the high-definition microscope images acquired by using the high-magnification objective lens 3$b$ are joined together. The created high-definition VS image is associated with the overall VS image in terms of the positional information and is stored in the data recording portion 34 in the form of an image data file (step S160).

When generating an additional high-definition VS image, the VS-image constructing processing from step S110 to S160 is repeated (step S170). For example, in the case in which a scanning region 44$b$ in the scanning region 44$a$ shown in FIG. 2B needs to be observed additionally by using a high-magnification objective lens (for example, 40×), a 40× objective lens is selected in step S110, and the operator specifies the region by manipulating the mouse (not shown) while referring to the high-definition VS image created for the scanning region 44$a$ in step S120 on the monitor 35.

Because the processing from steps S130 to S160 that follows is the same, descriptions thereof will be omitted; however, as a result, the overall VS image of the transmission-illumination bright-field specimen, the first high-definition VS image (the high-definition VS image formed for the scanning region 44$a$ by using the 10× objective lens), and the second high-definition VS image (the high-definition VS image formed for the scanning region 44$b$ by using the 40× objective lens), which are associated with the respective positional information, are stored in the data recording portion 34 in the form of image data files of the VS images.

Next, in a processing flow in a case in which a fluorescent specimen is employed, portions that are different from the case of the transmission-illumination bright-field specimen will be described.

In the processing in step S100 for acquiring the overall image of the slide glass specimen 40, the fluorescent-labeled specimen A is transparent in a non-excited state, and thus, the position of the specimen A cannot be recognized with ordinary bright-field observation.

Thus, for example, an overall VS image is constructed by giving dark-bright contrast to the specimen A by means of a method involving biased transmission illumination, phase contrast observation, or differential interference contrast observation (see Patent Literature 2). In addition, the dark-bright contrast may be given to the specimen A by adjusting the aperture stop (the field stop serves as the aperture stop in the case in which the top lens is flipped aside when using the low-magnification objective lens 3a).

Then, the specimen region 42 is identified in step S102, and, in order to realize the epi-illumination fluorescence observation method, various optical members are controlled to be placed in and removed from the optical path in step S104. Specifically, control is performed via the microscope controller 31, to turn off the transmission-illumination light source 8, to place the optical cube 22b for performing fluorescence observation in the optical path, to open the epi-illumination shutter 19, and so forth.

The VS-image constructing processing (steps S110 to S170) that follows is the same as in the case of using a transmission-illumination bright-field specimen, and thus, the overall VS image of the fluorescent specimen, the first high-definition VS image (the high-definition VS image formed for the scanning region 44a by using the 10× objective lens), and the second high-definition VS image (the high-definition VS image formed for the scanning region 44b by using the 40× objective lens), which are associated with the respective positional information, are stored in the data recording portion 34 in the form of image data files of the VS images.

{Shading Correction Processing}

Next, an overview of the shading correction processing will be described by using FIGS. 6A to 8I.

As for the shading correction processing, it is assumed to employ a method in which shading-correction data (hereinafter, referred to as correction gain data) are obtained based on changes in brightness of an image of a predetermined position when acquired at the center of the viewing field and when acquired at an edge of the viewing field by using the specimen A itself, which is an observation subject and a measurement subject, instead of using a calibration sample, and an overview thereof will be described below by using FIGS. 6A to 6F (see Patent Literature 6).

In this embodiment, a case in which positions are moved each time by ⅓ (number of divisions N=3) of a reference-field image 500 in the height direction (Y-direction) and/or the width direction (X-direction), as shown in FIGS. 6A to 6F, will be described as an example.

As shown in FIGS. 6A to 6F, one reference-field image 500 and four peripheral-field images 501 thereof, that is, a total of five images of the specimen A, are acquired. Then, shading-correction data for the two sections among the nine sections shown in FIG. 6F can be calculated by using the reference-field image 500 and one of the peripheral-field images 501.

Figure 6A:
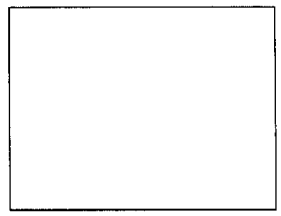
FIG. 6A is a diagram for explaining a two-field image method, which is an acquisition method by which the microscope system in FIG. 1 acquires shading-correction data.
Figure 6B:
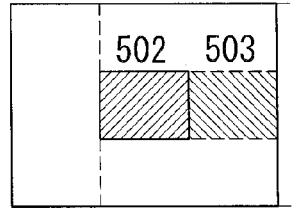
FIG. 6B is a diagram for explaining the two-field image method, which is an acquisition method by which the microscope system in FIG. 1 acquires shading-correction data.
Figure 6C:
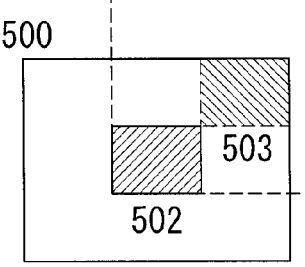
FIG. 6C is a diagram for explaining the two-field image method, which is an acquisition method by which the microscope system in FIG. 1 acquires shading-correction data.
Figure 6D:
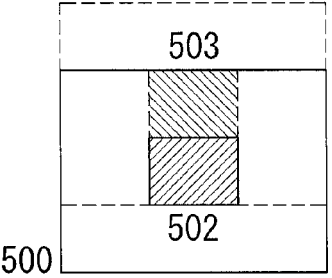
FIG. 6D is a diagram for explaining the two-field image method, which is an acquisition method by which the microscope system in FIG. 1 acquires shading-correction data.
Figure 6F:
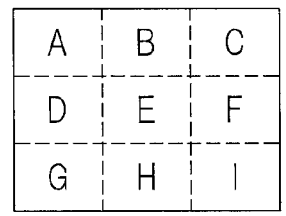
FIG. 6F is a diagram for explaining sections for which the microscope system in FIG. 1 acquires the shading-correction data.

For example, as shown in FIG. 6B, by dividing a center image 502 of the reference-field image 500 by a center-left image of the peripheral-field image 501, which corresponds to the center image 502, it is possible to obtain the correction gain data for the section D shown in FIG. 6F. In addition, in FIG. 6B, by dividing a center image 503 of the peripheral-field image 501 by a center-right image of the reference-field image 500, which corresponds to the center image 503, it is possible to obtain the correction gain data for the section F shown in FIG. 6F.

Figure 6E:
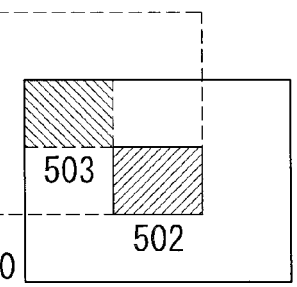
FIG. 6E is a diagram for explaining the two-field image method, which is an acquisition method by which the microscope system in FIG. 1 acquires shading-correction data.
Figure 7A:
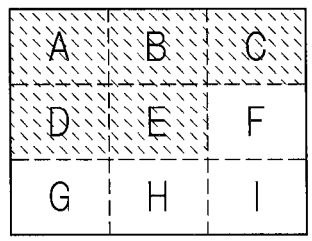
FIG. 7A is a diagram showing example qualified sections required for the acquisition of the shading-correction data by means of the two-field image method in FIGS. 6A to 6F.
Figure 7B:
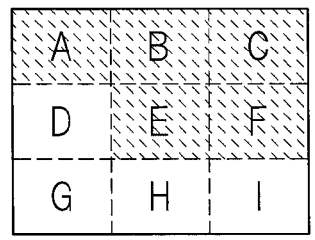
FIG. 7B is a diagram showing example qualified sections required for the acquisition of the shading-correction data by means of the two-field image method in FIGS. 6A to 6F.
Figure 7C:
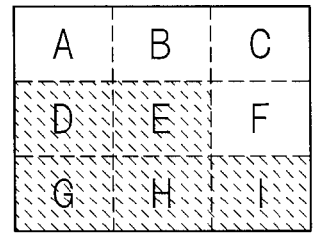
FIG. 7C is a diagram showing example qualified sections required for the acquisition of the shading-correction data by means of the two-field image method in FIGS. 6A to 6F.
Figure 7D:
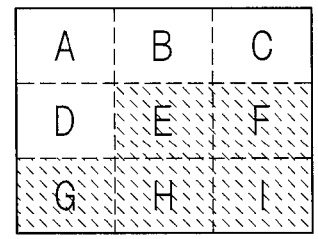
FIG. 7D is a diagram showing example qualified sections required for the acquisition of the shading-correction data by means of the two-field image method in FIGS. 6A to 6F.
Figure 7E:
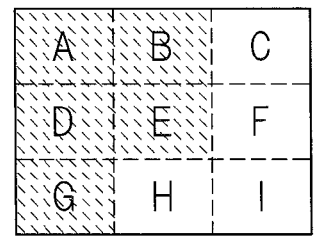
FIG. 7E is a diagram showing example qualified sections required for the acquisition of the shading-correction data by means of the two-field image method in FIGS. 6A to 6F.
Figure 7F:
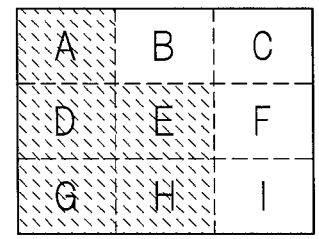
FIG. 7F is a diagram showing example qualified sections required for the acquisition of the shading-correction data by means of the two-field image method in FIGS. 6A to 6F.
Figure 7G:
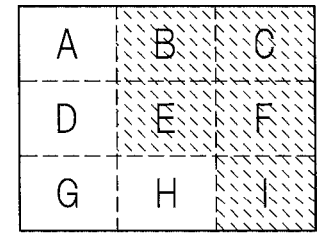
FIG. 7G is a diagram showing example qualified sections required for the acquisition of the shading-correction data by means of the two-field image method in FIGS. 6A to 6F.
Figure 7H:
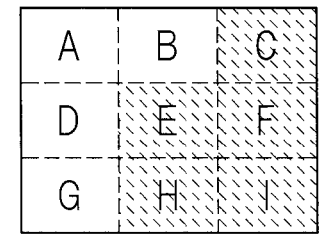
FIG. 7H is a diagram showing example qualified sections required for the acquisition of the shading-correction data by means of the two-field image method in FIGS. 6A to 6F.

Thereafter, by performing similar processing for the positional relationships between the reference-field image 500 and the peripheral-field images 501 shown in FIGS. 6C to 6E, it is possible to obtain the correction gain data for the eight peripheral sections shown in FIG. 6F, except for the center section E. Note that, because the center section E is an image captured near the center of the optical axis of the microscope apparatus 1 where the optical performance is good, it suffices to set the correction gain data to "1" (no correction data).

The shading correction (unevenness removal) of the acquired microscope images of the specimen A is performed by multiplying the acquired image data by the correction gain data.

Hereinafter, the method of obtaining the correction gain data by using the method described above will be referred to as the "two-field image method".

With the two-field image method, the number of image acquisitions determined by (N×N+1)/2 (five times in this embodiment because the number of divisions N=3) is sufficient to obtain the calibration image data, and the feature of the method is this low number of image acquisition. On the other hand, there is a constraint in that the method requires, as shown in FIGS. 7A to 7H, five adjacent sections (determined by a calculation similar to the one described above) that include the center section E, that have luminance information as uniform as possible, and in which the number of sites missing the information is low.

For example, in the case in which fluorescence observation is performed by using the objective lens 3a having a relatively low magnification, namely, a magnification of about 10×, it is extremely difficult to determine sites from which fluorescence will be emitted in a continuous region (N×N+1)/(2×N×N)≈½ within an image-acquisition area. In other words, when employing an observation method that uses a dark background (low amount of information), such as fluorescence observation, dark-field observation, or the like, it is desirable that an evaluation region for obtaining the correction gain data be smaller.

Therefore, aside from the "two-field image method", it is also effective to calculate the correction gain data by using a "one-center/N method", which will be described below.

Figure 8A:
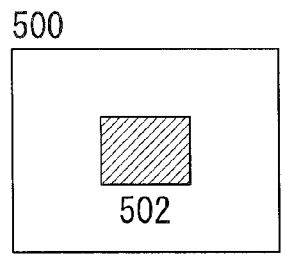
FIG. 8A is a diagram for explaining a one-center/N method, which is an acquisition method by which the microscope system in FIG. 1 acquires the shading-correction data.
Figure 8F:
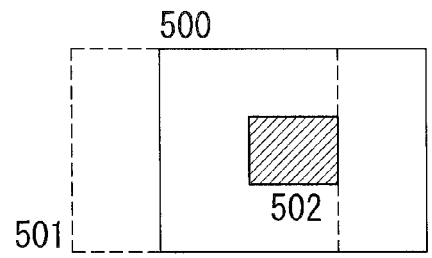
FIG. 8F is a diagram for explaining the one-center/N method, which is an acquisition method by which the microscope system in FIG. 1 acquires the shading-correction data.
Figure 8B:
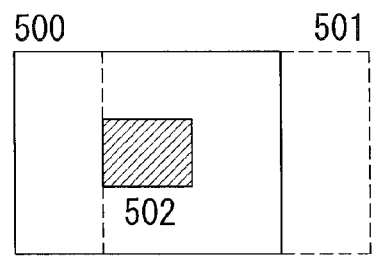
FIG. 8B is a diagram for explaining the one-center/N method, which is an acquisition method by which the microscope system in FIG. 1 acquires the shading-correction data.
Figure 8G:
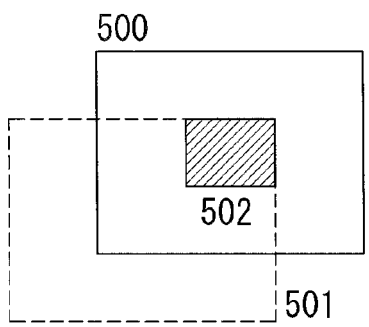
FIG. 8G is a diagram for explaining the one-center/N method, which is an acquisition method by which the microscope system in FIG. 1 acquires the shading-correction data.
Figure 8C:
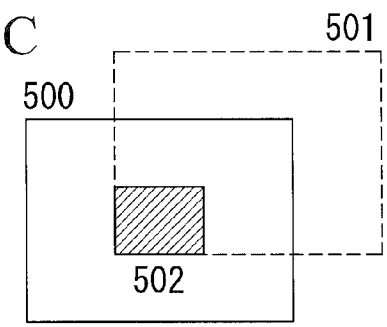
FIG. 8C is a diagram for explaining the one-center/N method, which is an acquisition method by which the microscope system in FIG. 1 acquires the shading-correction data.
Figure 8H:
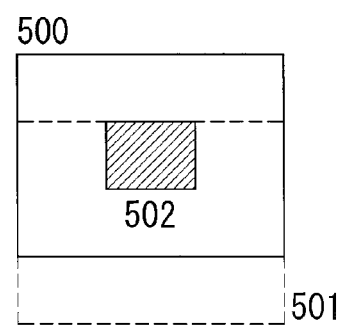
FIG. 8H is a diagram for explaining the one-center/N method, which is an acquisition method by which the microscope system in FIG. 1 acquires the shading-correction data.
Figure 8D:
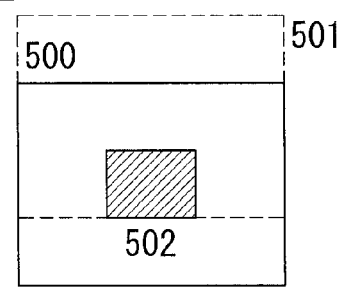
FIG. 8D is a diagram for explaining the one-center/N method, which is an acquisition method by which the microscope system in FIG. 1 acquires the shading-correction data.
Figure 8E:
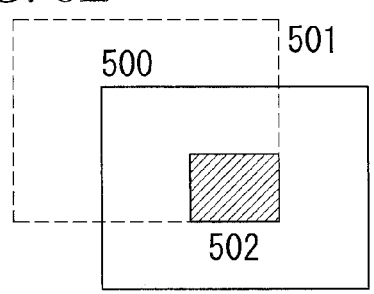
FIG. 8E is a diagram for explaining the one-center/N method, which is an acquisition method by which the microscope system in FIG. 1 acquires the shading-correction data.

As shown in FIG. 8A, the one-center/N method is a method in which only a region of the specimen A that corresponds to the center region 502 of the reference-field image 500 is used as an evaluation region for obtaining the correction gain data.

Specifically, one reference-field image 500 and eight peripheral-field images 501 thereof, that is, a total of nine images of the specimen A, are acquired. Then, the correction gain data are calculated by always using the center region 502 of the reference-field image 500 as the reference data, that is, by dividing the reference data by the data of the peripheral-field images 501 that correspond to the center region 502 shown in FIGS. 8B to 8I.

As compared with the two-field image method, the one-center/N method can reduce the evaluation region such that 2/(N×N+1)≈2/(N×N). On the other hand, the number of image acquisitions required for the one-center/N method is equal to N×N, that is, (2×N×N)/(N×N+1)≈2, and thus, the required number of image acquisitions becomes twice that in the case of the two-field image method; therefore, the method has advantages and disadvantages.

{Image Acquiring Processing for Shading Correction (Calibration)}

Next, methods used for acquiring image data to be used in this embodiment for performing shading correction (calibration) will be described. As for methods of determining a subject specimen region, there are three types of methods, described below.

(1) Determination based on a navigation (low-magnification) image that is used as a reference for determining a scanning region (existing-VS-image utilization method).
(2) Determination based on pre-scanning images obtained during the focus-map generation before generating a VS image (pre-scanning method).
(3) Determination based on original images before joining the adjacent sites for generating a VS image (VS-original-image utilization method).

With reference to the flowchart of the calibration-image acquiring processing shown in FIG. 9 and the flowchart of the VS-image constructing processing shown in FIG. 3, the operation flow from determination of the calibration-image acquisition sites to execution of the shading correction processing will now be described. Then, the details of the above-described three methods of the processing for determining the calibration-image acquisition site will subsequently be described.

First, it is judged whether or not existing VS images can be applied (step S200). In the case in which VS images that have previously been generated exist, including the overall VS image, and these VS images were formed by using the same observation method as for a VS image to be generated subsequently, it is possible to utilize the existing VS images. For example, in the embodiment described above, this is applicable in the cases described below.

(A) The case in which a VS image of the scanning region 44a shown in FIGS. 2A and 2B is constructed for a transmission-illumination bright-field specimen by utilizing an overall VS image generated in step S100.
(B) The case in which a high-definition VS image of the scanning region 44b is generated for a transmission-illumination bright-field specimen or a fluorescent specimen by utilizing a high-definition VS image of the scanning region 44a that has previously been generated by using the same observation method.

Also, in the case in which an existing VS image can be utilized, a region in the existing VS image with which a calibration image is acquired by using the existing VS image is searched to determine corresponding specimen sites, calibration image data are acquired by using the "two-field image method" or the "one-center/N method", described in the section about the shading correction processing, and thus, the correction gain data are calculated (step S210).

Figure 3:
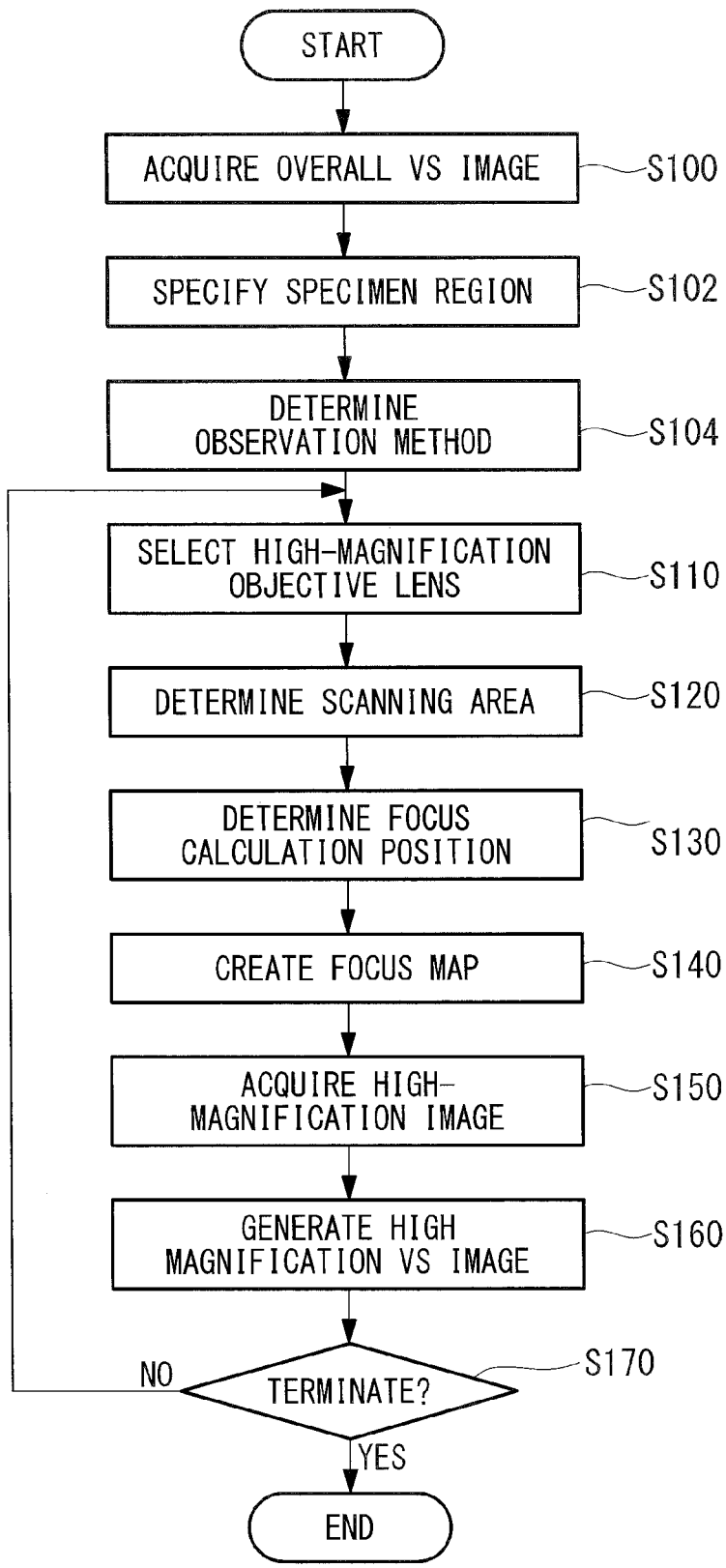
FIG. 3 is a flowchart showing the flow of VS-image constructing processing performed by the microscope system in FIG. 1.

The calculation processing of the correction gain data in steps S200 and S210, which utilizes the existing VS image, is performed after determining the scanning area in step S120 of the VS-image constructing processing shown in FIG. 3. Then, by using the calculated correction gain data, the processing for correcting the shading in an image of the specimen A is performed each time an image is acquired at the timing of acquiring the high-magnification image in step S150. In the case in which the correction gain data are generated, the processing is terminated (step S215).

In the case in which the correction gain data cannot be created by applying the existing VS images, images of the specimen A are acquired by sampling multiple locations thereof with conditions (observation method, objective lens, optical cube, or the like) for acquiring the VS image to be created (pre-scanning method), sites on the specimen A at which calibration images are to be acquired are determined by evaluating the acquired images, and, by using the "two-field image method" or the "one-center/N method", the calibration image data are acquired and the correction gain data are calculated (step S220). The processing in step S220 is performed during the processing related to the focus-map generation, that is, between step S120 and S160 of the VS-image constructing processing shown in FIG. 3.

In step S130, subsections for taking actual measurements of focus positions in the scanning region for the VS image to be created are selected, and images of the specimen A for determining the in-focus positions in the selected sections are acquired in step S140. By using the images of the specimen A in these subsections for taking actual focus measurements, appropriate sites of the specimen A to serve as the calibration-image acquisition regions are determined. Then, the correction gain data are calculated by acquiring calibration image data in accordance with the correction method. The processing for correcting the shading in an image of the specimen A by using the created correction gain data is performed each time an image is acquired in the processing for acquiring the high-magnification image in step S150. In the case in which the correction gain data are generated, the processing is terminated (step S225).

In the case in which the correction gain data cannot be created by means of the pre-scanning method, sites of the specimen A at which calibration images are to be acquired are determined by evaluating the original specimen images for forming a VS image, which have actually been acquired from the scanning region for the VS image to be created. Then, the correction gain data are calculated by acquiring the calibration image data by using the method in accordance with the "two-field image method" or the "one-center/N method" (step S230).

The processing in step S230 is performed after the acquisition of the high-magnification images in step S150 of the VS-image constructing processing shown in FIG. 3 has been completed. Subsequently, the correction gain data are calculated by acquiring the calibration image data in accordance with the correction method, and the shading in the high-magnification images, which have been acquired in step S150, is corrected by using the calculated correction gain data. Then, the VS-image forming processing of joining adjacent images is performed in step S160 by using the shading-corrected high-magnification images (VS original images). In the case in which the correction gain data are generated, the processing is terminated (step S235).

Note that, in the processing for creating the correction gain data based on the three methods described above, if it was not possible to find appropriate specimen regions for acquiring the calibration image data, the correction gain data will be filled with value of 1, which indicates no correction data (step S240). This completes the description of the operation flow from the determination of the calibration-image acquisition sites to the execution of the shading correction processing.

Note that, when creating a VS image of a specified scanning region in this embodiment, the correction gain data were created every time; however, in the case in which correction gain data have already been created for the same specimen with the same conditions (observation method, objective lens, optical cube, or the like) for acquiring the VS image, the previously-created correction gain data may be applied.

In addition, when applying the previously-created correction gain data, whether or not to apply the data may be set in accordance with the observation method (the transmission-illumination bright-field observation method, the epi-illumination bright-field observation method, the dark-field observation method, the fluorescence observation method, or the like). For example, in the case in which an industrial specimen is observed by using the epi-illumination bright-field observation method, the reflectance may differ depending on the sites on the sample (specimen A), and thus, it is often desirable to calculate correction gain data each time. On the other hand, in the case of an HE stained specimen, which is a typical pathological specimen, because the shading characteristics often do not depend on sites on the specimen A on the slide glass 38, it is desirable to apply previously-created correction gain data.

In addition, when applying previously-created correction gain data, the operator may select whether or not the data are applicable.

Furthermore, in the case in which it was not possible to create correction gain data, it is permissible to apply correction gain data that have previously been created by using another specimen or a calibration specimen with the same conditions (observation method, objective lens, optical cube, or the like) for acquiring the VS image, and that are saved in the data recording portion 34.

{Existing-VS-Image Utilization Method}

Figure 10:
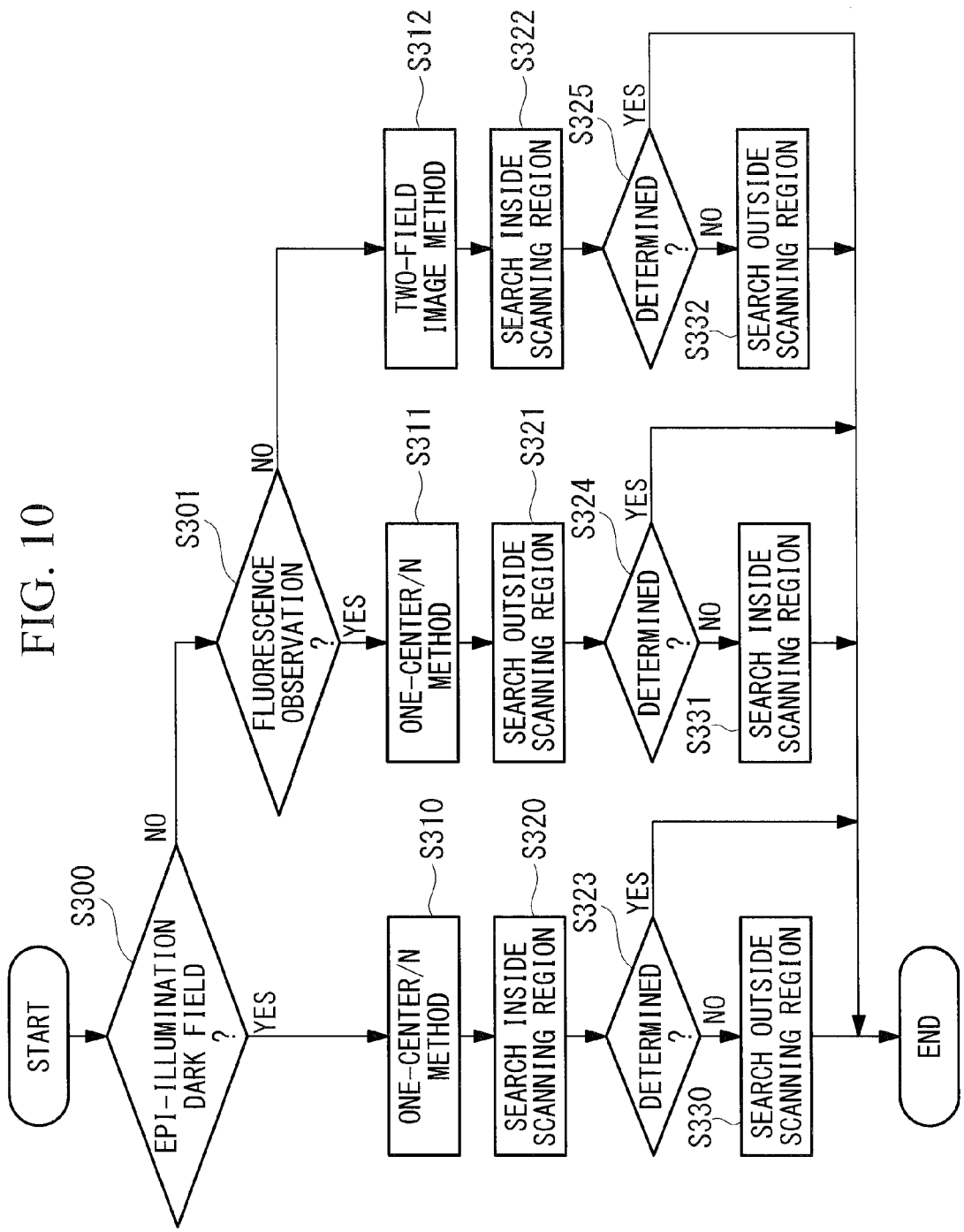
FIG. 10 is a flowchart showing an acquisition method of the shading-correction data in the microscope system in FIG. 1, which branches depending on the observation methods.

The existing-VS-image utilization method, which is the first method of determining the calibration-image acquisition sites, will be described below by using FIG. 10.

First, the processing is assigned in accordance with the observation method (steps S300 and S301). The observation method is determined in step S104 of the VS-image constructing processing shown in FIG. 3.

Subsequently, the shading-correction-data acquisition method is determined in accordance with the observation method. Specifically, in the case in which the observation method is the epi-illumination dark-field observation method or the fluorescence observation method, the "one-center/N method" is selected (steps S310 and S311), and the "two-field image method" is selected in the cases of other observation methods (step S312).

Then, in determining the calibration specimen sites, a high-priority region in an existing VS image is selected, and sites having desirable luminance information are searched for in the image. The way in which the priority region is selected differs depending on the observation method; outside the scanning region is selected in the case of the fluorescence observation for the purpose of preventing photobleaching (step S321), and inside the scanning region is selected in the cases of other observation methods (steps S320 and S322).

As a result of searching the priority region, the processing is terminated if appropriate specimen sites are found (steps S323 to S325), and regions other than the priority region are searched if appropriate specimen sites are not found (steps S330 to S332).

An overview of the search processing will be described below.

For example, the case in which a high-definition VS image of the scanning region 44a shown in FIGS. 2A and 2B is constructed for a transmission-illumination bright-field specimen by utilizing an overall VS image generated in step S100 will be described as an example.

In other words, this is a case in which the transmission-illumination bright-field observation method is employed as the observation method, an overall VS image is created by using an objective lens having a magnification of 2×, and a high-definition VS image of the scanning region 44a is created by using the same observation method and a 10× objective lens. Because the observation method is the transmission-illumination bright-field observation method in this embodiment, the "two-field image method" is selected as the shading-correction-data acquisition method, and the priority region to be searched is set to inside the scanning region 44a.

Figure 11:
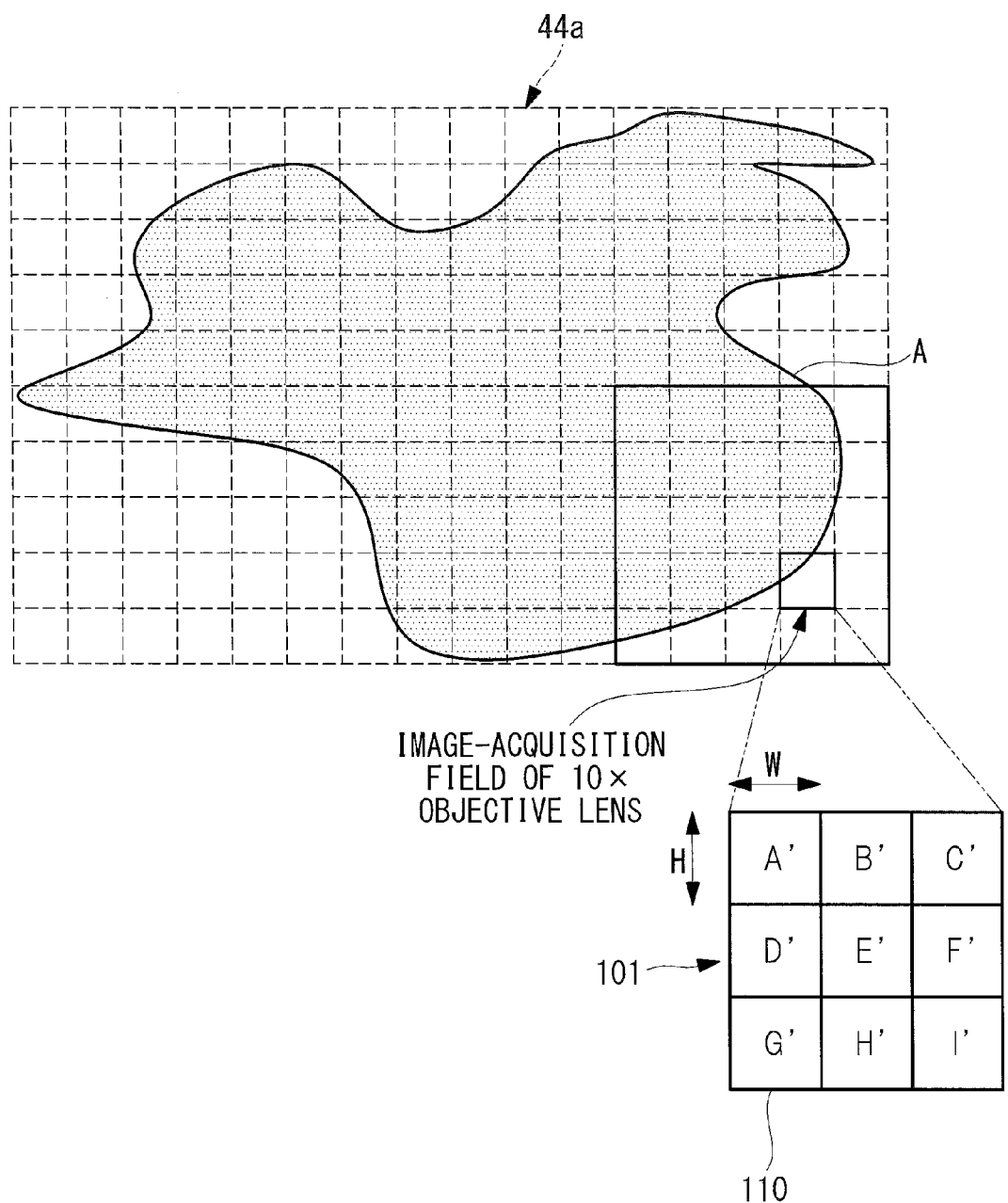
FIG. 11 is a diagram showing an example in which an existing VS image is divided into subsections depending on methods by which the existing VS image is utilized in the microscope system in FIG. 1.

First, as shown in FIG. 11, the search region is divided into subsections (correction subsections 110), which serve as basic units of correction evaluation. The size of one section is determined by formulas (1) and (2) below.

$$W = (\text{Width}/N) \times (\text{Mag1}/\text{Mag2}) \quad (1)$$

$$H = (\text{Height}/N) \times (\text{Mag1}/\text{Mag2}) \quad (2)$$

Here,

W is the number of pixels of a subsection in the lateral direction (X-direction), H is the number of pixels of the subsection in the longitudinal direction (Y-direction), Width is the number of pixels of the camera 24 in the lateral direction (X-direction), Height is the number of pixels of the camera 24 in the longitudinal direction (Y-direction), N is the number of divisions applied to one viewing field of an acquired image to be used in the shading correction processing, Mag1 is the magnification of the objective lens used when creating the existing VS image, and Mag2 is the magnification of the objective lens to be used when creating a VS image to be created.

For example, in the case in which a camera having 1200 pixels each in the X-direction and the Y-direction is used as the camera 24, $W=H=(1200/3)\times(2/10)=80$ pixels. Then, the correction subsections 110 are judged to be qualified as calibration-image sites if they include equal to or greater than a predetermined value (for example, 90%) of pixels whose luminance values Y fall within a predetermined range (a minimum value$\leq Y \leq$a maximum value) for the existing VS image in the correction subsections 110.

Because the "two-field image method" is employed as the shading-correction-data acquisition method in this embodiment, sites in the specimen region 42 that are appropriate as the calibration-image acquisition sites are determined, as shown in FIGS. 7A to 7H, by searching the search region for sites having any one of qualified section patterns (portions indicated by hatching) in 3×3 regions, from the upper left portion to the lower right portion of the search region while shifting one section at a time.

Then, if an appropriate site does not exist, regions excluding the above-described search processing area in the overall VS image shown in FIGS. 2A and 2B are searched in the specimen region 42. Because the search processing is the same, a description thereof will be omitted.

Next, the case of fluorescence observation will be described.

An example described here is a case in which a high-definition VS image of the scanning region 44b shown in FIGS. 2A and 2B is generated for a fluorescent specimen by utilizing a high-definition VS image of the scanning region 44a that has previously been generated by using the same observation method. In other words, this is a case in which the fluorescence observation method is employed as the observation method, a high-definition VS image of the scanning region 44a is created by using a 10× objective lens, and a high-definition VS image of the scanning region 44b is created by using the same observation method and a 40× objective lens.

Because the observation method is the fluorescence observation method in this embodiment, the "one-center/N method" is selected as the shading-correction-data acquisition method, and the priority region to be searched is set to regions inside the scanning region 44a, excluding the scanning region 44b.

The above-described formulas are applied, and thus, the size of the subsections is W=H=(1200/3)×(10/40)=100 pixels. In performing the search, because it suffices to find qualified regions having only one section, the search method is simple as compared with the case of the "two-field image method", and thus, a description thereof will be omitted.

As has been described above, with this embodiment, it is possible to determine specimen sites for acquiring calibration images by using existing VS images.

Note that, although the subsection regions are determined by using formulas (1) and (2), it is possible to increase the search precision by applying further divisions thereto. For example, in the example of the fluorescence observation method, the size of the subsections is set to 25 pixels, that is, ¼ of the original size, and the evaluation is performed for the entire 4×4 region. Because sections are shifted one at a time when performing the search, it is possible to search for the qualified sites with greater precision. In addition, it is also possible to apply further divisions to the subsection region in the case of the "two-field image method".

In addition, in the case in which the shading-correction-data acquisition method is the "one-center/N method", because the qualified regions become restricted due to the characteristics of the specimen A and the observation method, the subsection regions may be further divided only in such a case.

In addition, in the case of the fluorescence observation, in consideration of photobleaching of the specimen A, it is desirable to employ the "two-field image method", which requires a lower number of calibration-image acquisitions. Therefore, in the case in which qualified sites are found by searching a region by using the "two-field image method" first, the correction gain data may be calculated by acquiring the calibration image data by using the "two-field image method".

In addition, it is also possible to determine a plurality of qualified-site candidates and to select, for example, a candidate site having the smallest variance.

In addition, in the case in which it was not possible to determine qualified regions by searching a VS image first by using a method in accordance with the "two-field image method", the VS image may be searched again by using a method in accordance with the "one-center/N method".

In addition, in the case of fluorescence observation, in consideration of photobleaching of the specimen A, repeated acquisition of the calibration image data from the same site may cause a deterioration in precision due to photobleaching. Therefore, regions of the specimen A that have been used once to acquire calibration data (neighboring two-field regions, namely, the reference-field image 500 and a peripheral region thereof) may be excluded from the search.

{Pre-Scanning Method}

The pre-scanning method, which is the second method of determining the calibration-image acquisition site, will be described below by using FIG. 12.

The pre-scanning method is a method in which specimen sites for acquiring the calibration images are determined based on images acquired by sampling specimen images with the conditions for acquiring a VS image to be created in a region of the specimen A selected from a plurality of arbitrarily selected sites, and the basic difference from the existing-VS-image utilization method described above relates to the image used to perform the region search. The determination of the shading-correction-data acquisition method is similarly performed based on the observation method.

Figure 9:
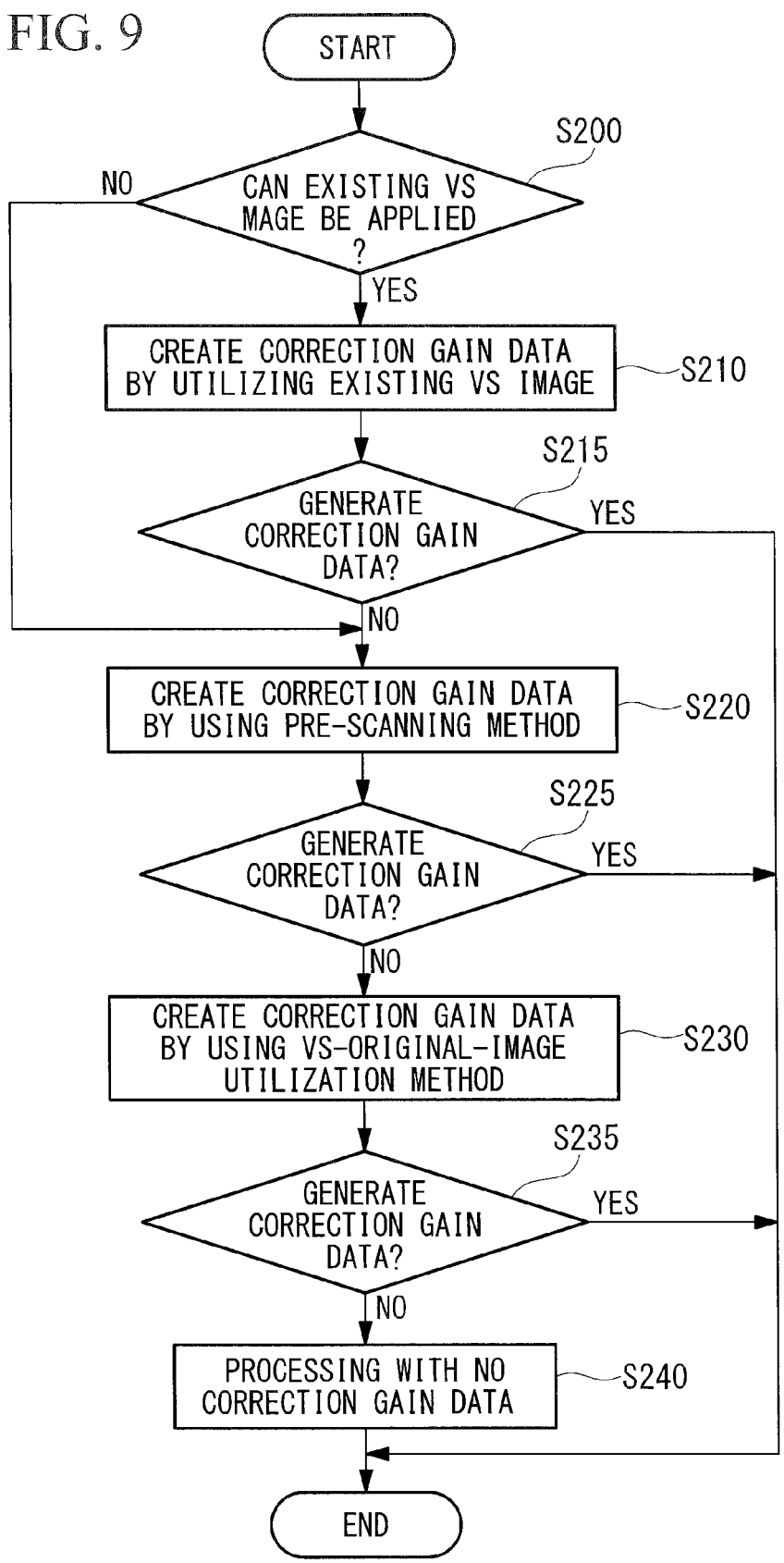
FIG. 9 is a flowchart showing the flow of shading-correction processing performed by the microscope system in FIG. 1.

With regard to the sites in which sampling is performed, it has already been described that the acquired images of the specimen sites that correspond to the sites for taking actual measurements for the focus map are acquired in the calibration-image acquiring processing flow in FIG. 9.

First, an acquired sampling image (corresponding to a region indicated by the image-acquisition field 101) is divided in the longitudinal direction and the lateral direction into 1/N subsections (correction subsections 110). Here, a case of making 3×3 divisions, that is, division into nine sections, will be described as an example. Then, the sampling image is searched by using the same method as in the existing-VS-image utilization method to investigate whether or not qualified regions exist. Note that, as in the case of the existing-VS-image utilization method, the search precision may be increased by applying further division to the correction subsections 110.

Then, similar search processing is performed for all acquired sampling images, and the optimal specimen site for acquiring the calibration image is determined. Subsequently, the calibration image is acquired based on the shading-correction-data acquisition method, and the correction gain data are created.

Note that, in the case of fluorescence observation, because the "one-center/N method" is selected and the image acquisition is performed N×N times (nine times in this embodiment) in neighboring regions including the calibration-image acquisition site, the method may be affected by fluorescence photobleaching. Therefore, by dispersing sites for acquiring the reference-field image 500 of the calibration image into multiple sites, instead of acquiring images at one location at the center and eight neighboring sites thereof, as shown in FIGS. 8A to 8I, it is possible to reduce the influence of fluorescence photobleaching by reducing the amount of time for which the same specimen site is irradiated with excitation light.

For example, a case in which the eight regions indicated by reference signs A to I in FIG. 12 have been judged to include qualified regions as a result of evaluating the sampling image (in order to simplify the description, a case in which the correction subsection E' has been judged to be qualified and selected as the reference-field image 500) will be described as an example.

Individual sample-acquisition images of the regions indicated by the reference signs A to I are used as the reference-field images 500, the calibration images are acquired by using individually different peripheral-field images 501 at the regions indicated by the reference signs A to I, that is, by moving the stage to corresponding positional relationships in order to acquire the correction gain data that correspond to the letters shown in sections in FIG. 6F, and thus, the correction gain data are calculated.

Figure 8I:
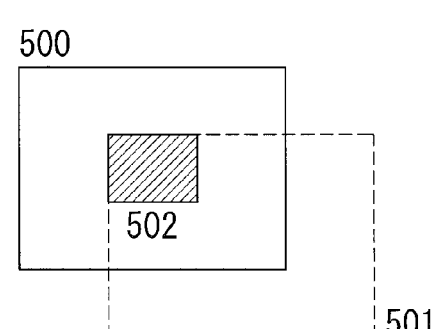
FIG. 8I is a diagram for explaining the one-center/N method, which is an acquisition method by which the microscope system in FIG. 1 acquires the shading-correction data.
Figure 12:
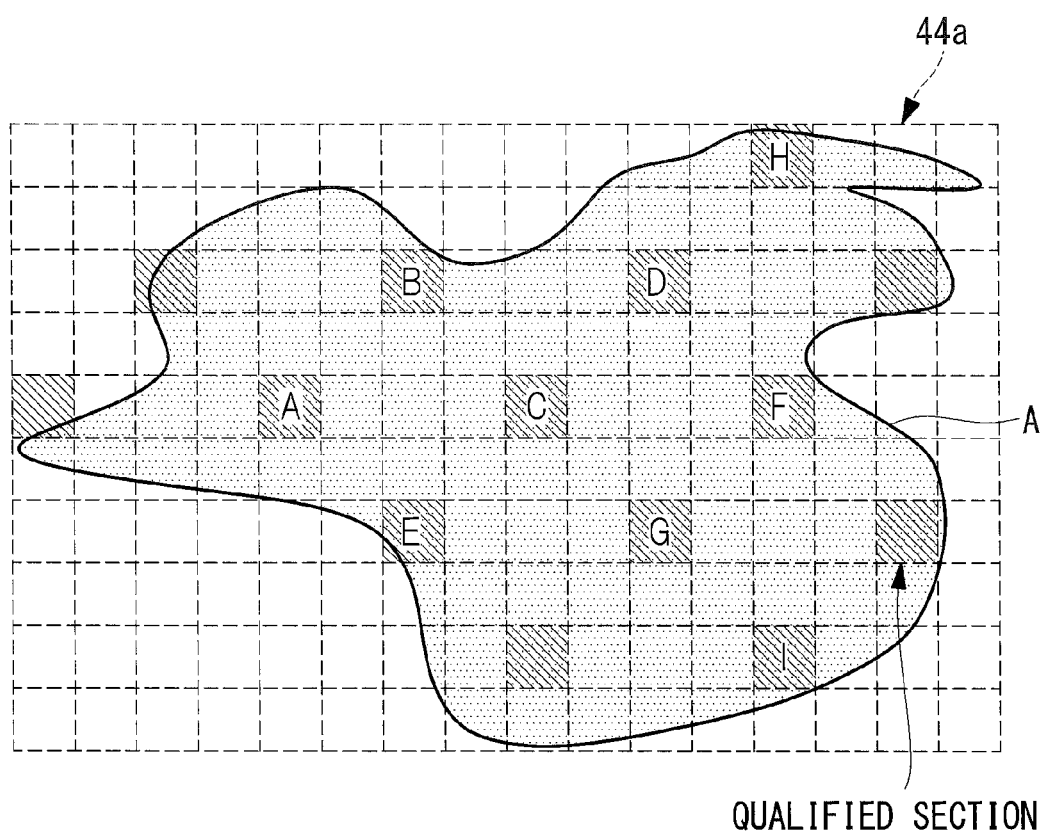
FIG. 12 is a diagram showing an example in which a plurality of correction-image acquisition regions are selected by means of a pre-scanning method in the microscope system in FIG. 1.

The correction gain data for the section A in FIG. 6F are calculated by acquiring the peripheral-field image 501 having a relative positional relationship shown in FIG. 8I with respect to a reference image (for which the sampling image is applied) whose center coordinates correspond to the qualified site E' of the section A in FIG. 12. By performing similar processing for the regions indicated by the reference signs B to I and by setting the predetermined value (value of 1) for the center section E, the creation of the correction gain data is completed for all sections indicated by the reference signs A to I.

In addition, in the case of fluorescence observation and dark-field observation, it may be difficult to determine a region that has uniform emission in evaluation regions defined by one-center/N sections in the reference-field image 500. Therefore, for example, in the case in which a qualified region is not found in all sampling images acquired at the focus-position identifying points, the correction gain data can be created by identifying a plurality of reference-region candidates having relatively high emission and by deleting non-emission sites by taking the average thereof.

For example, in order to simplify the description, it is assumed that center portions of the sections indicated by the reference signs A, D, and G in FIG. 12 have been calculated as the reference-region candidates. In the case in which a center-region average image, which is an average of center evaluation regions of sampling images of the sections indicated by the reference signs A, D, and G, is judged to be qualified as a calibration-image site, the peripheral-field image data may be acquired for the eight neighboring sections for the individual sections indicated by the reference signs A, D, and G, and the correction gain data may be created by using the average image thereof.

In addition, because there is the influence of photobleaching in the case of fluorescence observation, it is desirable that the calibration image data are acquired by using regions outside the VS-image generating area. Therefore, the correction gain data may be created by performing processing similar to the above-described processing by arbitrarily setting the search regions in regions in which the specimen exists outside the scanning area for the VS image to be generated.

{VS-Original-Image Utilization Method}

Because the VS-original-image utilization method involves processing that is basically similar to the pre-scanning method, a description of the method of determining the calibration-image acquisition site will be omitted.

The VS-original-image utilization method uses all images acquired in a scanning area for creating a VS image as evaluation subjects, whereas the pre-scanning method uses images acquired at arbitrary sampling points as evaluation subjects. Therefore, it is possible to reduce errors in searching regions for acquiring the calibration image data (i.e., a situation in which a qualified region cannot be found) caused by an inappropriate identification of sampling points.

In addition, by employing this method, it is also possible to correct shading in the overall VS image created in step S100 in the flow of the VS-image constructing processing in FIG. 3. Specifically, based on images acquired by scanning the specimen search area 41 in FIGS. 2A and 2B by using an objective lens having a magnification of 2×, specimen sites for creating the calibration data are determined, the calibration image data are acquired, and the shading-correction data are created, and thus, it is possible to form an overall VS image in which unevenness is reduced by joining adjacent images after correcting shading in the original images for constructing the overall VS image at a magnification of 2×.

Furthermore, in this embodiment, the overall VS image is acquired by using the transmission-illumination bright-field observation method both in the case of a transmission-illumination bright-field specimen and the case of a fluorescent specimen. With a transmission-illumination bright-field specimen, because a background portion and a specimen portion both have high luminance information, it is possible to perform sampling in arbitrary regions in the specimen search area 41, and it is also possible to create the shading-correction data by using the pre-scanning method.

Figure 13:
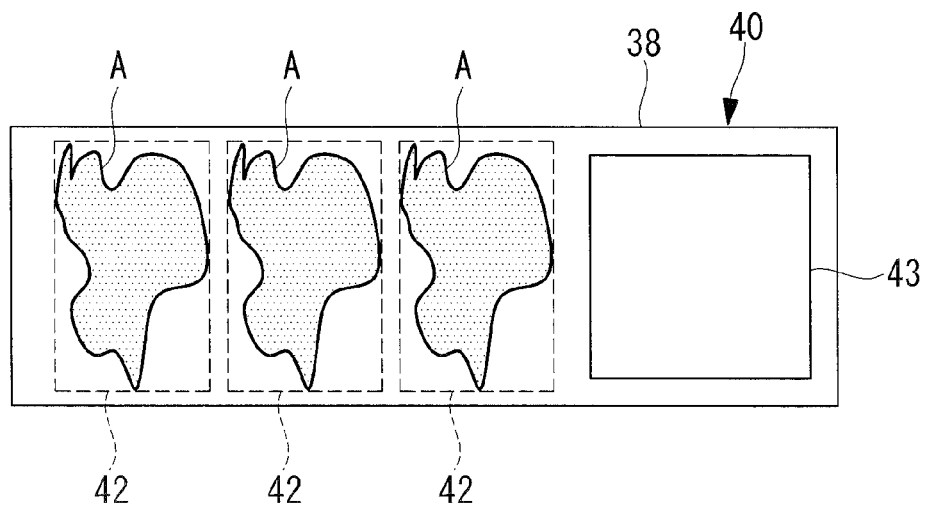
FIG. 13 is a diagram showing an example of a slide glass specimen to be observed by using the microscope system in FIG. 1 on which a plurality of specimens are mounted.

Example Application 1: Shading Correction when a Plurality of Specimens are Mounted In a pathological diagnosis, there are cases in which one specimen-embedded block is thinly sliced in a continuous manner, and a plurality of specimens A are mounted on a single slide glass 38, as shown in FIG. 13. In addition, in the case of a small specimen for a biopsy, there are cases in which thinly sliced specimens A from a plurality of embedded blocks are mounted on the same slide glass 38 so as to efficiently perform diagnosis. In other words, because a plurality of different specimens A are mounted on a single slide glass 38, it is desirable to perform shading correction in accordance with the respective specimens A.

Also, with transmission-illumination bright-field pathological specimens (HE stained specimens, special-staining specimens, and immunostaining specimens) employed in pathological diagnosis, in general, VS images are often constructed by using an objective lens having a magnification of 20× in consideration of the resolving power and the file capacity.

Therefore, the transmission-illumination bright-field method is selected in step S104 of the VS-image constructing processing flow shown in FIG. 3, and an objective lens having a magnification of 20× is selected in the objective-lens selection in step S110. In addition, in the scanning-area selecting processing in step S120, the specimens are judged to be separate specimens if bounding rectangles of the specimen regions 42 are separated by a predetermined distance or more (for example, 2 mm or greater), and, by separately setting scanning regions for the specimen regions 42, VS images will be constructed for the respective scanning regions. In the case of transmission-illumination bright-field observation, because the calculations of the shading-correction data for the scanning regions are prioritized, it is possible to automatically perform the unevenness correction in accordance with the respective specimens A.

Also, Patent Literature 3 discloses a method of automatically and continuously creating VS-image files of a plurality of pathological specimens by using a slide transferring apparatus, and, by combining the microscope system with a slide transferring apparatus, it is possible to continuously and automatically generate VS-image files in which unevenness is appropriately corrected in transmission-illumination bright-field pathological specimens (HE stained specimens, special-staining specimens, and immunostaining specimens), which are routinely subjected to microscopic examination in pathological diagnosis.

Example Application 2: Division of Correction Region

Figure 14A:
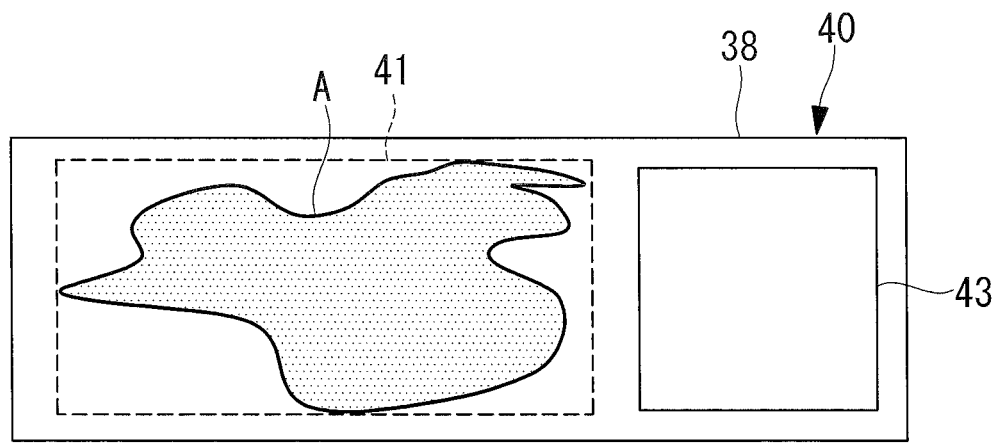
FIG. 14A is a diagram showing a specimen region to be observed by using the microscope system in FIG. 1.

In the case in which a VS image is created at a high-magnification for the entirety of a specimen A that is large enough to occupy nearly the entire specimen search area 41 as shown in FIG. 14A as an example, in other words, in the case in which a VS image is created for a scanning region having a height or width that is equal to or greater than a predetermined value, unevenness is sometimes generated due to changes in the orthogonality between the optical axis and the specimen A due to an increase in the amount by which the electrically-powered stage 2 is moved.

Figure 14B:
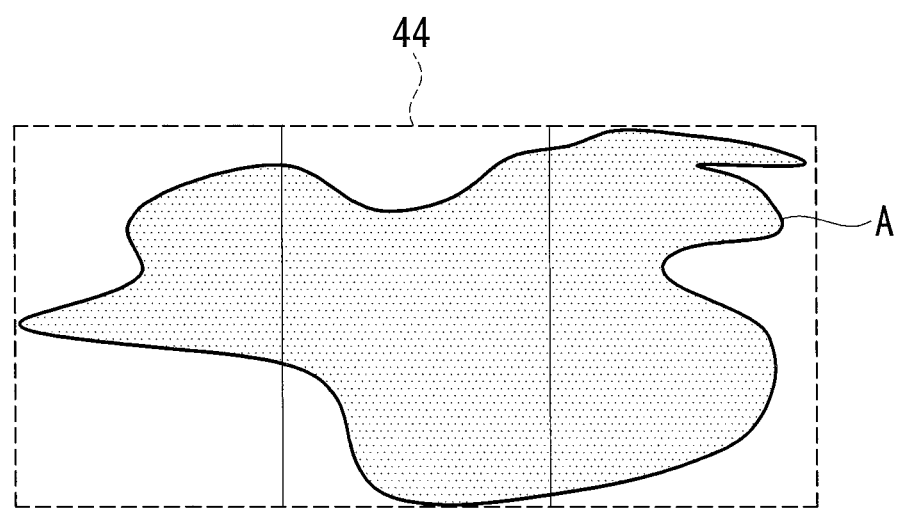
FIG. 14B is a diagram showing an example in which the specimen region to be observed by using the microscope system in FIG. 1 is divided into a plurality of subsections.

In this case, as shown in FIG. 14B, by dividing the scanning region 44 into a plurality of sections so that the region size becomes equal to or less than a predetermined value and by performing the acquisition of the shading-correction data and the shading correction for the individual sections, it is possible to create a VS image in which unevenness caused by the specimen size is corrected.

In addition, the shading-correction data may be obtained for arbitrary sites of the plurality of specimens A in a similar manner as done during the focus-map generation, and, for the regions for which the shading-correction data are not calculated, the shading-correction data may be obtained by means of interpolation by using the shading-correction data of the neighboring regions that have already been acquired.

Figure 15:
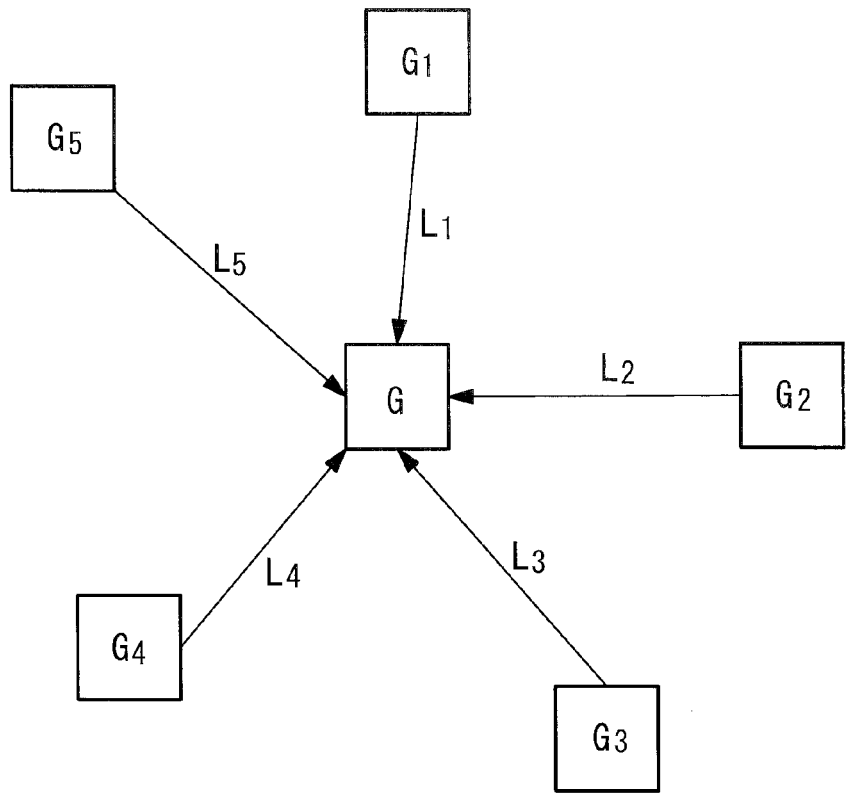
FIG. 15 is a diagram for explaining a case in which the shading-correction data are calculated by means of interpolation by using the microscope system in FIG. 1.

For example, as shown in FIG. 15, assuming that Gi is the correction gain data of neighboring actual-measurement sections and Li is a distance from computation-target sections, correction gain data G for the computation-target sections is determined as follows:

$$G=\Sigma(Gi/Li)/\Sigma(1/Li).$$

The above-described embodiment is derived from the following individual aspects of the present invention.

An aspect of the present invention is a microscope system including an objective lens that collects light coming from a specimen; an image acquiring means for capturing an image of the light collected by the objective lens; a moving means for moving the specimen and the objective lens relative to each other in a direction perpendicular to an optical axis; a VS-image generating means for generating a virtual-slide image by joining together a plurality of microscope-image groups that are acquired by the image acquiring means while moving the objective lens and the specimen relative to each other by means of the moving means; a correction-region searching means for searching for a correction region for acquiring a correction image for generating shading-correction data; a correction-data generating means for causing the image acquiring means to acquire the correction image for the correction region searched for by the correction-region searching means and for generating the shading-correction data based on the acquired correction image; and a shading correcting means for correcting shading in the microscope image by using the shading-correction data generated by the correction-data generating means.

With this aspect, a plurality of microscope-image groups are acquired by operating the image acquiring means while moving the objective lens and the specimen relative to each other in the direction perpendicular to the optical axis by operating the moving means, and a large-field virtual-slide image is generated by joining together the acquired microscope-image groups by means of the VS-image generating means. In this case, the correction-data generating means causes the image acquiring means to acquire the correction image for the correction region searched for by operating the correction-region searching means, and the shading-correction data are generated based on the acquired correction image. Then, because shading in the microscope image is corrected by the shading correcting means by using the generated shading-correction data, it is possible to acquire a virtual-slide image without unevenness by using the VS-image generating means.

In the above-described aspect, the correction-data generating means may generate the shading-correction data each time the virtual-slide image is generated by the VS-image generating means.

By doing so, it is possible to generate a virtual-slide image without unevenness in a simple and more reliable manner, even if there are changes in the states of apparatuses in the optical system, the image-acquisition system, or the like and the state of the specimen.

In addition, the above-described aspect may be provided with a magnification changing means for changing a magnification and a high-magnification VS-image-region specifying means for specifying a specimen region for which a high-magnification virtual-slide image of a higher magnification is to be constructed by using a low-magnification virtual-slide image generated from low-magnification microscope-image groups, wherein the VS-image generating means generates the high-magnification virtual-slide image for a specimen region specified by the high-magnification VS-image-region specifying means.

By doing so, the specimen region for which a high-magnification virtual-slide image is to be constructed is specified by the high-magnification VS-image-region specifying means in a low-magnification virtual-slide image generated by the VS-image generating means in a state in which the magnification is set to low by the magnification changing means, and a high-magnification virtual-slide image is generated by the VS-image generating means for the specified specimen region after changing the magnification by means of the magnification changing means. Because a previously acquired low-magnification virtual-slide image is used when constructing the high-magnification virtual-slide image, it is possible to specify the specimen region in a simple manner.

In addition, in the above-described aspect, the correction-region searching means may search for the correction region for correcting shading in the high-magnification virtual-slide image in the low-magnification virtual-slide image.

By doing so, it is possible to determine the correction region in a simple manner by searching the low-magnification virtual-slide image for the correction region for correcting shading in the high-magnification virtual-slide image.

In addition, in the above-described aspect, the correction-region searching means may determine a plurality of candidate regions in the low-magnification virtual-slide image, may cause the image acquiring means to acquire images of the determined plurality of the candidate regions at a magnification with which microscope images for the high-magnification virtual-slide image are to be acquired, and may select the candidate region having appropriate image information for performing shading correction from the acquired images so as to be used as the correction region.

By doing so, the images acquired with image-acquisition conditions for generating the high-magnification virtual-slide image are searched for a candidate region having appropriate image information for preforming the shading correction so as to be used as the correction region. By doing so, it is possible to generate a high-magnification virtual-slide image to which the shading correction is more precisely applied.

In addition, in the above-described aspect, the correction-region searching means may search for the correction region for correcting shading in the high-magnification virtual-slide image in regions that are inside a specimen region for constructing the low-magnification virtual-slide image and that are also outside a specimen region for constructing the high-magnification virtual-slide image.

By doing so, it is possible to set the correction region in a specimen region outside the specimen region for which the high-magnification virtual-slide image is to be actually constructed, and it is possible to suppress photobleaching of the specimen in the case of fluorescence observation.

In addition, in the above-described aspect, the correction-region searching means may select a specimen region having appropriate image information for performing shading correction from a microscope-image group for generating a virtual-slide image so as to be used as the correction region.

By doing so, even in the case in which a region having appropriate image information for performing the shading correction cannot be found in the correction region in the previously acquired virtual-slide image, it is possible to search for the correction region by using the microscope-image groups for generating a virtual-slide image.

In addition, in the above-described aspect, the correction-data generating means may divide the correction region into a plurality of sections and generates shading-correction data based on a ratio between luminance values of two different sections obtained for a plurality of correction images acquired by shifting the sections by an amount corresponding to the size of each section.

By doing so, it is possible to generate the shading-correction data in a simple manner based on a ratio between the luminance value of the center section of the correction image that serves as the reference and the luminance value of another section of another correction image acquired by shifting the sections by an amount corresponding to the size of the section.

In addition, in the above-described aspect, the correction-data generating means may select a shading-correction-data generating method in which the number of correction images to be acquired is lower when luminance values of the individual sections are greater than a predetermined threshold.

By doing so, in a correction region in which the individual sections have high luminance values, it is possible to generate the shading-correction data in a short period of time by reducing the number of the correction images to be acquired. On the other hand, in the case of a correction region in which the individual sections have low luminance values, by increasing the number of the correction images to be acquired, it is possible to precisely correct shading by effectively utilizing the sections having high luminance values, even if doing so is time consuming.

In addition, in the above-described aspect, the correction-data generating means may select the generating method in accordance with an observation method.

In the case of an observation method with which microscope images having low luminance values are acquired, such as fluorescence observation and dark-field observation, the number of the correction images to be acquired is increased, and, in the case of an observation method with which microscope images having high luminance values are acquired, such as bright-field observation, a time reduction can be achieved by reducing the number of correction images to be acquired.

In addition, in the above-described aspect, the high-magnification VS-image-region specifying means may specify a plurality of specimen regions for constructing a high-magnification virtual-slide image by using the low-magnification virtual-slide image, and the shading correcting means may correct shading in the microscope image for each of the specimen regions.

By doing so, it is possible to efficiently acquire virtual-slide images whose shading has been corrected for the plurality of specimens arranged on the single slide glass, without exchanging the slide glass.

In addition, in the above-described aspect, the correction-region searching means may search for a plurality of the correction regions, and the correction-data generating means may generate shading-correcting-portion data of different sections in the searched-for plurality of the correction regions, and generates shading-correction data by combining the generated shading-correcting-portion data.

By doing so, even in the case in which a region that has appropriate image information for performing shading correction cannot be found as a single correction region, it is possible to generate shading-correction data for precisely correcting shading by collecting the information about the plurality of correction regions.

In addition, in the above-described aspect, the correction-region searching means may search for a plurality of the correction regions, and the correction-data generating means may generate shading-correction data based on a ratio between luminance values of two different sections obtained for a plurality of average correction images, which are acquired by taking averages of luminance values of correction images, which are individually acquired for the searched-for plurality of the correction regions.

By doing so, even in the case in which a region that has appropriate image information for performing shading correction cannot be found as a single correction region, it is possible to generate shading-correction data for precisely correcting shading by collecting information about the plurality of correction regions and by taking an average thereof.

In addition, in the above-described aspect, the correction-region searching means may search for a plurality of the correction regions, and the correction-data generating means may individually generate shading-correction data for the searched-for plurality of the correction regions, and, as for a specimen region for which the shading-correction data have not been generated, the correction-data generating means generates the shading-correction data by performing interpolation based on distances to neighboring correction regions.

By doing so, it is not necessary to generate shading-correction data based on actual measurements for all specimen regions, and it is possible to acquire a virtual-slide image whose shading has been corrected in a short period of time.

REFERENCE SIGNS LIST 1 microscope system
2 electrically-powered stage (moving means)
3a, 3b objective lens
7 revolver (magnification changing means)
24 camera (image acquiring means)
30 host system (VS-image generating means, correction-region searching means, correction-data generating means, shading correcting means, high-magnification VS-image-region specifying means)
42 specimen region
A specimen

The invention claimed is:
1. A microscope system comprising:
a stage that is configured to have a specimen mounted thereon;
a plurality of objective lenses, each of which is configured to collect light coming from the specimen;
a camera that is configured to capture an image of the light collected by one of the plurality of objective lenses; and
a processor comprising hardware, wherein the processor is configured to:
set a first objective lens from the plurality of objective lenses;
acquire a plurality of first microscope-images with the camera by moving the specimen relative to the first objective lens in a direction perpendicular to an optical axis of the first objective lens;

generate a low-magnification virtual-slide image by joining together the plurality of first microscope-images;

search for a correction region for generating shading-correction data in the low-magnification virtual-slide image;

generate the shading-correction data based on a correction image for the correction region;

set a second objective lens, the second objective lens having a higher magnification as compared to the first objective lens;

acquire a plurality of second microscope-images with the camera, by moving the specimen relative to the second objective lens in a direction perpendicular to an optical axis of the second objective lens;

correct the plurality of second microscope-images based on the shading-correction data; and generate a high-magnification virtual-slide image by joining together the plurality of second microscope-images, wherein the processor is configured to search for the correction region by searching for the correction region for correcting shading in the high-magnification virtual-slide image in regions that are inside a specimen region for constructing the low-magnification virtual-slide image and that are also outside a specimen region for constructing the high-magnification virtual-slide image.

2. A microscope system according to claim 1, wherein the processor is configured to generate shading-correction data by generating the shading-correction data each time the virtual-slide image is generated.

3. A microscope system according to claim 1, wherein the processor is configured to search for the correction region by determining a plurality of candidate regions in the low-magnification virtual-slide image, causes the camera to acquire images of the determined plurality of the candidate regions at a magnification with which microscope images for the high-magnification virtual-slide image are acquired, and selects the candidate region having appropriate image information for performing shading correction from the acquired images used as the correction region.

4. A microscope system according to claim 1, wherein the processor is configured to search for the correction region by selecting a specimen region having appropriate image information for performing shading correction from a microscope-image group for generating a virtual-slide image used as the correction region.

5. A microscope system according to claim 1, wherein the processor is configured to generate the shading-correction data by dividing the correction region into a plurality of sections and generates shading-correction data based on a ratio between luminance values of two different sections obtained for a plurality of correction images acquired by shifting the sections by an amount corresponding to the size of each section.

6. A microscope system according to claim 5, wherein the processor is configured to generate the shading-correction data by selecting a shading-correction-data generating method in which the number of correction images acquired is lower when luminance values of the individual sections are greater than a predetermined threshold.

7. A microscope system according to claim 6, wherein the processor is configured to generate the shading-correction data by selecting the generating method in accordance with an observation method.

8. A microscope system according to claim 1, wherein the processor is further configured to specify a plurality of specimen regions for constructing a high-magnification virtual-slide image by using the low-magnification virtual-slide image, and wherein the correcting the plurality of second microscope-images corrects shading in the microscope image for each of the specimen regions.

9. A microscope system according to claim 5, wherein the processor is configured to search the correction region by searching for a plurality of the correction regions, and the processor is configured to generate the shading-correction data by generating shading-correcting-portion data of different sections in the searched-for plurality of the correction regions, and generates shading-correction data by combining the generated shading-correcting-portion data.

10. A microscope system according to claim 5, wherein the processor is configured to search for a plurality of the correction regions, and the processor is configured to generate the shading-correction data by generating shading-correction data based on a ratio between luminance values of two different sections obtained for a plurality of average correction images, which are acquired by taking averages of luminance values of correction images, which are individually acquired for the searched-for plurality of the correction regions.

11. A microscope system according to claim 5, wherein the processor is configured to search for the correction region by searching for a plurality of the correction regions, and the processor is configured to generate the shading-correction data by generating shading-correction data for the searched-for plurality of the correction regions, and, as for a specimen region for which the shading-correction data have not been generated, the processor configured to generate the shading-correction data by performing interpolation based on distances to neighboring correction regions.

* * * * *